United States Patent
Fukazawa et al.

(10) Patent No.: US 10,963,063 B2
(45) Date of Patent: Mar. 30, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Ryo Fukazawa, Kanagawa (JP); Kuniaki Torii, Kanagawa (JP); Takahiro Okayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 33 days.

(21) Appl. No.: 15/772,243

(22) PCT Filed: Oct. 26, 2016

(86) PCT No.: PCT/JP2016/081755
§ 371 (c)(1),
(2) Date: Apr. 30, 2018

(87) PCT Pub. No.: WO2017/104272
PCT Pub. Date: Jun. 22, 2017

(65) Prior Publication Data
US 2018/0299963 A1    Oct. 18, 2018

(30) Foreign Application Priority Data
Dec. 18, 2015  (JP) .............................. JP2015-247184

(51) Int. Cl.
*G06F 3/01*    (2006.01)
*G06F 3/16*    (2006.01)
(Continued)

(52) U.S. Cl.
CPC ............. *G06F 3/017* (2013.01); *G02B 27/01* (2013.01); *G02B 27/017* (2013.01); *G06F 3/011* (2013.01);
(Continued)

(58) Field of Classification Search
CPC ........ G06F 3/017; G06F 3/013; G06F 3/0304; G06F 3/011; G06F 3/16; G02B 27/01; G02B 27/017; G02B 2027/0187
See application file for complete search history.

(56) References Cited

U.S. PATENT DOCUMENTS 5,732,394 A * 3/1998 Nakadai ................. G10L 15/04
704/238
5,787,395 A * 7/1998 Minamino ............. G10L 15/08
704/255

(Continued)

FOREIGN PATENT DOCUMENTS

CN     103562821 A     2/2014
JP     2007-193422 A   8/2007
(Continued)

*Primary Examiner* — Amy Onyekaba
(74) *Attorney, Agent, or Firm* — Paratus Law Group, PLLC

(57) ABSTRACT

There is provided an information processing apparatus, an information processing method, and a program, the information processing apparatus including: an acquisition unit configured to acquire a recognition accuracy related to a recognition based on sensing data; and a control unit configured to make a first user operation recognizable when the recognition accuracy is included in a first range, and make a second user operation recognizable when the recognition accuracy is included in a second range different from the first range, the second user operation being different from the first user operation and related to the first user operation.

18 Claims, 12 Drawing Sheets

(51) Int. Cl.
*G02B 27/01* (2006.01)
*G06F 3/03* (2006.01)

(52) U.S. Cl.
CPC ............ *G06F 3/013* (2013.01); *G06F 3/0304* (2013.01); *G06F 3/16* (2013.01); *G02B 2027/0187* (2013.01)

(56) References Cited

U.S. PATENT DOCUMENTS

| | | | |
|---|---|---|---|
| 5,854,999 A * | 12/1998 | Hirayama | G10L 15/20 704/226 |
| 7,971,156 B2 * | 6/2011 | Albertson | G06F 21/36 715/863 |
| 7,996,218 B2 * | 8/2011 | Kim | G10L 15/22 704/236 |
| 8,649,604 B2 * | 2/2014 | Steinberg | G06K 9/00288 382/190 |
| 8,756,508 B2 * | 6/2014 | Ohki | G06F 40/177 715/727 |
| 8,830,302 B2 * | 9/2014 | Im | H04N 13/207 348/46 |
| 9,025,082 B2 * | 5/2015 | Asukai | H04N 1/00167 348/584 |
| 9,189,068 B2 * | 11/2015 | Im | G06F 3/017 |
| 9,488,721 B2 * | 11/2016 | Kitajima | G06T 5/20 |
| 9,750,420 B1 * | 9/2017 | Agrawal | G06T 7/73 |
| 9,811,716 B2 * | 11/2017 | Kim | G06K 9/00228 |
| 10,289,192 B2 * | 5/2019 | Provancher | G06F 3/03547 |
| 10,514,767 B2 * | 12/2019 | Ishiwata | G06K 9/00355 |
| 2002/0001398 A1 * | 1/2002 | Shimano | G06K 9/6293 382/104 |
| 2002/0184019 A1 * | 12/2002 | Hartley | G10L 15/08 704/240 |
| 2003/0128876 A1 * | 7/2003 | Yamaguchi | G06K 9/6211 382/190 |
| 2004/0008889 A1 * | 1/2004 | Ikeda | G06K 9/6821 382/182 |
| 2004/0015365 A1 * | 1/2004 | Ohmori | G10L 15/22 704/276 |
| 2004/0161151 A1 * | 8/2004 | Iwayama | G06K 9/222 382/187 |
| 2004/0243562 A1 * | 12/2004 | Josenhans | H04M 1/271 |
| 2005/0075875 A1 * | 4/2005 | Shozakai | G06K 9/00335 704/231 |
| 2005/0117803 A1 * | 6/2005 | Ikeda | G06K 9/00449 382/190 |
| 2005/0131693 A1 * | 6/2005 | Kim | G10L 15/12 704/248 |
| 2005/0131699 A1 * | 6/2005 | Fukada | G10L 15/06 704/270 |
| 2005/0157908 A1 * | 7/2005 | Matsugu | G06K 9/00885 382/107 |
| 2005/0169502 A1 * | 8/2005 | Takahashi | G06K 9/3258 382/105 |
| 2005/0196044 A1 * | 9/2005 | Nagahashi | G06K 9/00228 382/190 |
| 2006/0122831 A1 * | 6/2006 | Jeong | G10L 25/78 704/231 |
| 2006/0274943 A1 * | 12/2006 | Abdulkader | G06K 9/00436 382/186 |
| 2007/0027685 A1 * | 2/2007 | Arakawa | G10L 21/0208 704/226 |
| 2007/0192101 A1 * | 8/2007 | Braho | G10L 15/065 704/251 |
| 2007/0206862 A1 * | 9/2007 | Takeda | G06K 9/6254 382/209 |
| 2007/0225975 A1 * | 9/2007 | Imoto | G10L 15/065 704/233 |
| 2007/0258644 A1 * | 11/2007 | Kawahara | G06K 9/627 382/181 |
| 2007/0286497 A1 * | 12/2007 | Podilchuk | G06K 9/6206 382/218 |
| 2008/0002862 A1 * | 1/2008 | Matsugu | G06K 9/00248 382/115 |
| 2008/0002887 A1 * | 1/2008 | Revow | G06K 9/03 382/187 |
| 2008/0077391 A1 * | 3/2008 | Chino | G10L 15/26 704/7 |
| 2008/0137917 A1 * | 6/2008 | Okubo | G06K 9/6234 382/118 |
| 2008/0219502 A1 * | 9/2008 | Shamaie | G06K 9/00355 382/103 |
| 2008/0270338 A1 * | 10/2008 | Adams | G06K 9/00986 706/48 |
| 2009/0077504 A1 * | 3/2009 | Bell | G06F 3/04812 715/863 |
| 2009/0100383 A1 * | 4/2009 | Sunday | G06F 3/04883 715/863 |
| 2009/0129656 A1 * | 5/2009 | Filatov | G06T 7/0012 382/132 |
| 2009/0197615 A1 * | 8/2009 | Kim | H04W 52/027 455/456.1 |
| 2009/0210227 A1 * | 8/2009 | Sugiyama | G10L 15/22 704/246 |
| 2009/0273574 A1 * | 11/2009 | Pryor | G06F 3/04883 345/173 |
| 2010/0004930 A1 * | 1/2010 | Strope | G10L 15/00 704/240 |
| 2010/0046840 A1 * | 2/2010 | Hashiguchi | G06K 9/033 382/201 |
| 2010/0070277 A1 * | 3/2010 | Arakawa | G10L 15/02 704/246 |
| 2010/0073497 A1 * | 3/2010 | Katsumata | H04N 5/23203 348/211.99 |
| 2010/0195917 A1 * | 8/2010 | Kubota | G06K 9/624 382/218 |
| 2011/0001813 A1 * | 1/2011 | Kim | G06K 9/00355 348/77 |
| 2011/0066627 A1 * | 3/2011 | Seung | G06F 16/54 707/758 |
| 2011/0080336 A1 * | 4/2011 | Leyvand | G06F 3/017 345/156 |
| 2011/0081089 A1 * | 4/2011 | Mori | G06K 9/00281 382/218 |
| 2011/0090359 A1 * | 4/2011 | Sagawa | H04N 5/232945 348/222.1 |
| 2011/0125503 A1 * | 5/2011 | Dong | G10L 21/0216 704/275 |
| 2011/0141009 A1 * | 6/2011 | Izumi | A63F 13/04 345/156 |
| 2011/0158540 A1 * | 6/2011 | Suzuki | G06K 9/00288 382/195 |
| 2011/0205042 A1 * | 8/2011 | Takemura | G01S 17/93 340/435 |
| 2011/0210928 A1 * | 9/2011 | Matsuda | G06F 3/04886 345/173 |
| 2011/0222726 A1 * | 9/2011 | Ruan | G06K 9/00355 382/103 |
| 2011/0229020 A1 * | 9/2011 | Yoshii | G06K 9/6227 382/159 |
| 2011/0243398 A1 * | 10/2011 | Suzuki | G06K 9/6255 382/118 |
| 2011/0320949 A1 * | 12/2011 | Ohki | G06F 40/177 715/727 |
| 2012/0053446 A1 * | 3/2012 | Lossev | G06T 7/0012 600/407 |
| 2012/0063639 A1 * | 3/2012 | Yano | G06K 9/4642 382/103 |
| 2012/0081568 A1 * | 4/2012 | Suzuki | H04N 13/275 348/222.1 |
| 2012/0082384 A1 * | 4/2012 | Kaneda | G06K 9/00308 382/195 |
| 2012/0094754 A1 * | 4/2012 | Suzuki | A63F 13/5255 463/30 |
| 2012/0146903 A1 * | 6/2012 | Arihara | G06K 9/209 345/158 |
| 2012/0176305 A1 * | 7/2012 | Ryu | G06K 9/00335 345/156 |

(56) References Cited

U.S. PATENT DOCUMENTS

| | | | |
|---|---|---|---|
| 2012/0218227 A1* | 8/2012 | Ohashi | G06F 3/042 345/175 |
| 2012/0235903 A1* | 9/2012 | Im | G06F 3/005 345/158 |
| 2012/0268492 A1* | 10/2012 | Kasahara | G06K 9/00993 345/633 |
| 2012/0328198 A1* | 12/2012 | Takahashi | G06K 9/00281 382/195 |
| 2013/0004081 A1* | 1/2013 | Baba | G06K 9/00677 382/195 |
| 2013/0041665 A1* | 2/2013 | Jang | H04N 21/478 704/246 |
| 2013/0077831 A1* | 3/2013 | Momozono | G06F 3/017 382/107 |
| 2013/0088422 A1* | 4/2013 | Niikura | G06F 3/017 345/156 |
| 2013/0120250 A1* | 5/2013 | Lin | G06F 3/0304 345/157 |
| 2013/0156266 A1* | 6/2013 | Horii | G06F 3/016 382/103 |
| 2013/0181948 A1* | 7/2013 | Sakai | G06F 3/0425 345/175 |
| 2013/0182077 A1* | 7/2013 | Holz | G06K 9/46 348/46 |
| 2013/0182898 A1* | 7/2013 | Maeda | G06F 3/005 382/103 |
| 2013/0182915 A1* | 7/2013 | Hanna | G06F 21/32 382/116 |
| 2013/0201159 A1* | 8/2013 | Inamoto | G06F 3/0418 345/178 |
| 2013/0222232 A1* | 8/2013 | Kong | G06F 3/0304 345/156 |
| 2013/0234957 A1* | 9/2013 | Shirato | G06F 3/0416 345/173 |
| 2013/0241925 A1* | 9/2013 | Konami | G06F 3/013 345/419 |
| 2013/0243268 A1* | 9/2013 | Bedros | G06K 9/036 382/118 |
| 2013/0257748 A1* | 10/2013 | Ambrus | G06F 3/0426 345/173 |
| 2013/0321261 A1* | 12/2013 | Nakasu | G06F 3/0304 345/156 |
| 2013/0322785 A1* | 12/2013 | Kamamori | G06T 11/60 382/311 |
| 2013/0328925 A1* | 12/2013 | Latta | G09G 3/003 345/633 |
| 2013/0330006 A1* | 12/2013 | Kuboyama | G06K 9/00771 382/190 |
| 2013/0339019 A1* | 12/2013 | Giancarlo | G10L 15/1807 704/251 |
| 2014/0022193 A1* | 1/2014 | Kim | G06F 3/0416 345/173 |
| 2014/0043232 A1* | 2/2014 | Kurokawa | G06F 3/017 345/156 |
| 2014/0055342 A1* | 2/2014 | Kamimura | G06F 3/013 345/156 |
| 2014/0055349 A1* | 2/2014 | Itoh | G06F 3/005 345/156 |
| 2014/0062864 A1* | 3/2014 | Lee | H04N 13/204 345/156 |
| 2014/0062866 A1* | 3/2014 | Yamashita | G06F 3/017 345/156 |
| 2014/0064557 A1* | 3/2014 | Hara | G06F 3/012 382/103 |
| 2014/0085452 A1* | 3/2014 | Nistico | A61B 3/113 348/78 |
| 2014/0101578 A1* | 4/2014 | Kwak | G06F 1/1647 715/761 |
| 2014/0136215 A1* | 5/2014 | Dai | G10L 15/22 704/275 |
| 2014/0140579 A1* | 5/2014 | Takemoto | G01C 3/08 382/106 |
| 2014/0140583 A1* | 5/2014 | Yano | G06K 9/00268 382/118 |
| 2014/0153774 A1* | 6/2014 | Obata | G06K 9/00355 382/103 |
| 2014/0161305 A1* | 6/2014 | Lee | G06K 9/00771 382/103 |
| 2014/0172231 A1* | 6/2014 | Terada | G06K 9/00832 701/36 |
| 2014/0232636 A1* | 8/2014 | Hara | G06K 9/00671 345/156 |
| 2014/0254880 A1* | 9/2014 | Srinivasan | G06K 9/00335 382/106 |
| 2014/0285426 A1* | 9/2014 | Minagawa | G06F 3/01 345/156 |
| 2014/0285427 A1* | 9/2014 | Minagawa | G06F 3/017 345/156 |
| 2014/0314278 A1* | 10/2014 | Tatsuzawa | G06T 7/11 382/103 |
| 2014/0330561 A1* | 11/2014 | Cho | G10L 15/22 704/235 |
| 2014/0337786 A1* | 11/2014 | Luo | G06F 3/041 715/773 |
| 2014/0354602 A1* | 12/2014 | He | G06F 3/0304 345/175 |
| 2014/0368456 A1* | 12/2014 | Sakai | G06F 3/041 345/173 |
| 2014/0376770 A1* | 12/2014 | Nister | G06K 9/00375 382/103 |
| 2015/0002394 A1* | 1/2015 | Cho | G02B 27/0093 345/156 |
| 2015/0006172 A1* | 1/2015 | Alameh | G10L 15/26 704/235 |
| 2015/0054735 A1* | 2/2015 | Nakama | G06F 3/0304 345/156 |
| 2015/0125043 A1* | 5/2015 | Kimura | G06K 9/03 382/106 |
| 2015/0142437 A1* | 5/2015 | Kobayashi | G10L 15/08 704/246 |
| 2015/0154449 A1* | 6/2015 | Ito | G06K 9/00375 382/103 |
| 2015/0199824 A1* | 7/2015 | Kim | G06K 9/00355 382/103 |
| 2015/0205995 A1* | 7/2015 | Yamada | G06K 9/00255 382/118 |
| 2015/0251600 A1* | 9/2015 | Mochizuki | G06T 11/203 345/7 |
| 2015/0254983 A1* | 9/2015 | Mochizuki | G06T 11/206 340/435 |
| 2015/0258432 A1* | 9/2015 | Stafford | A63F 13/5255 463/32 |
| 2015/0261303 A1* | 9/2015 | Tanaka | G06F 3/017 345/156 |
| 2015/0269835 A1* | 9/2015 | Benoit | H04M 19/04 340/539.13 |
| 2015/0294639 A1* | 10/2015 | McCoy | G06F 3/017 345/173 |
| 2015/0301688 A1* | 10/2015 | Cho | B60K 37/00 345/175 |
| 2015/0304252 A1* | 10/2015 | Ogata | H04L 51/043 715/733 |
| 2015/0331490 A1* | 11/2015 | Yamada | G10L 25/78 345/156 |
| 2015/0331665 A1* | 11/2015 | Ishii | H04N 21/4826 715/728 |
| 2015/0332275 A1* | 11/2015 | Prodam | G06K 9/00885 382/115 |
| 2015/0339515 A1* | 11/2015 | Tomita | G06K 9/00288 382/118 |
| 2015/0340040 A1* | 11/2015 | Mun | G10L 25/78 704/246 |
| 2015/0367859 A1* | 12/2015 | Roth | G01C 21/365 701/36 |
| 2016/0004908 A1* | 1/2016 | Lundberg | G06F 3/03 382/103 |
| 2016/0011768 A1* | 1/2016 | Yim | H04M 1/271 345/173 |

(56) References Cited

U.S. PATENT DOCUMENTS

| | | | |
|---|---|---|---|
| 2016/0034037 A1* | 2/2016 | Leng | G06F 3/005 345/156 |
| 2016/0048212 A1* | 2/2016 | Leng | G06F 3/017 345/156 |
| 2016/0054805 A1* | 2/2016 | Lee | B25J 13/003 700/83 |
| 2016/0062459 A1* | 3/2016 | Publicover | G02B 27/0093 345/633 |
| 2016/0132124 A1* | 5/2016 | Nakamura | G06T 7/20 345/156 |
| 2016/0132993 A1* | 5/2016 | Akiyama | G06F 1/1694 345/657 |
| 2016/0140763 A1* | 5/2016 | Seichter | G06F 3/04812 345/633 |
| 2016/0210838 A1* | 7/2016 | Yan | G08B 25/001 |
| 2016/0314790 A1* | 10/2016 | Tsujikawa | G10L 17/04 |
| 2016/0320486 A1* | 11/2016 | Murai | G01S 17/10 |
| 2016/0349925 A1* | 12/2016 | Kamamori | G06F 3/017 |
| 2016/0364561 A1* | 12/2016 | Lee | G06K 9/00255 |
| 2017/0017393 A1* | 1/2017 | Luo | G06F 3/04817 |
| 2017/0031452 A1* | 2/2017 | Isayama | G06F 3/017 |
| 2017/0038846 A1* | 2/2017 | Minnen | G06F 3/1423 |
| 2017/0123492 A1* | 5/2017 | Marggraff | H04N 5/247 |
| 2017/0168586 A1* | 6/2017 | Sinha | G06K 9/00382 |
| 2017/0277968 A1* | 9/2017 | Ikeda | G06K 9/42 |
| 2017/0344811 A1* | 11/2017 | Ni | G06K 9/00288 |
| 2018/0046254 A1* | 2/2018 | Takayanagi | G06F 3/0304 |
| 2018/0114413 A1* | 4/2018 | Tsuchimochi | G06K 9/00 |
| 2018/0165828 A1* | 6/2018 | Sasatani | G06T 7/70 |
| 2018/0276837 A1* | 9/2018 | Amano | G06K 9/4642 |
| 2018/0303667 A1* | 10/2018 | Peyman | A61B 34/35 |

FOREIGN PATENT DOCUMENTS

| | | |
|---|---|---|
| WO | WO 2012/147960 A1 | 11/2012 |
| WO | WO 2012/147960 A1 | 7/2014 |
| WO | WO2014162762 * | 10/2014 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2016/081755 (filed on Oct. 26, 2016) under 35 U.S.C. § 371, which claims priority to Japanese Patent Application No. JP 2015-247184 (filed on Dec. 18, 2015), which are all hereby incorporated by reference in their entirety.

TECHNICAL FIELD

The present disclosure relates to an information processing apparatus, an information processing method, and a program.

BACKGROUND ART

In recent years, technologies enabling equipment to be operated by recognition based on sensing are being used. For example, Patent Literature 1 below discloses a technology in which a user wearing a head-mounted display (HMD) including a camera causes the camera to capture (sense) various gestures using one's own hands, and operates the HMD by gesture recognition.

CITATION LIST

Patent Literature

Patent Literature 1: JP 2014-186361A

DISCLOSURE OF INVENTION

Technical Problem

However, the recognition of a user operation based on the sensing of gestures or the like also fails sometimes. For example, there is a risk of lowered recognition accuracy due to the state of the user, the surrounding environment, device performance, and the like. For example, if the operating method is identical in the case of low recognition accuracy and the case of high recognition accuracy, operations often are not recognized, and since the user ends up repeating the same operation over and over until the operation is recognized, the burden on the user is large.

Accordingly, the present disclosure proposes a novel and improved information processing apparatus, information processing method, and program enabling operation by user operations depending on the recognition accuracy.

Solution to Problem

According to the present disclosure, there is provided an information processing apparatus including: an acquisition unit configured to acquire a recognition accuracy related to a recognition based on sensing data; and a control unit configured to make a first user operation recognizable when the recognition accuracy is included in a first range, and make a second user operation recognizable when the recognition accuracy is included in a second range different from the first range, the second user operation being different from the first user operation and related to the first user operation.

In addition, according to the present disclosure, there is provided an information processing method including: acquiring a recognition accuracy related to a recognition based on sensing data; and executing control, with a processor, to make a first user operation recognizable when the recognition accuracy is included in a first range, and to make a second user operation recognizable when the recognition accuracy is included in a second range different from the first range, the second user operation being different from the first user operation and related to the first user operation.

In addition, according to the present disclosure, there is provided a program causing a computer to realize: an acquisition function of acquiring a recognition accuracy related to a recognition based on sensing data; and a control function of making a first user operation recognizable when the recognition accuracy is included in a first range, and making a second user operation recognizable when the recognition accuracy is included in a second range different from the first range, the second user operation being different from the first user operation and related to the first user operation.

Advantageous Effects of Invention

According to the present disclosure as described above, operation by user operations depending on the recognition accuracy is possible.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
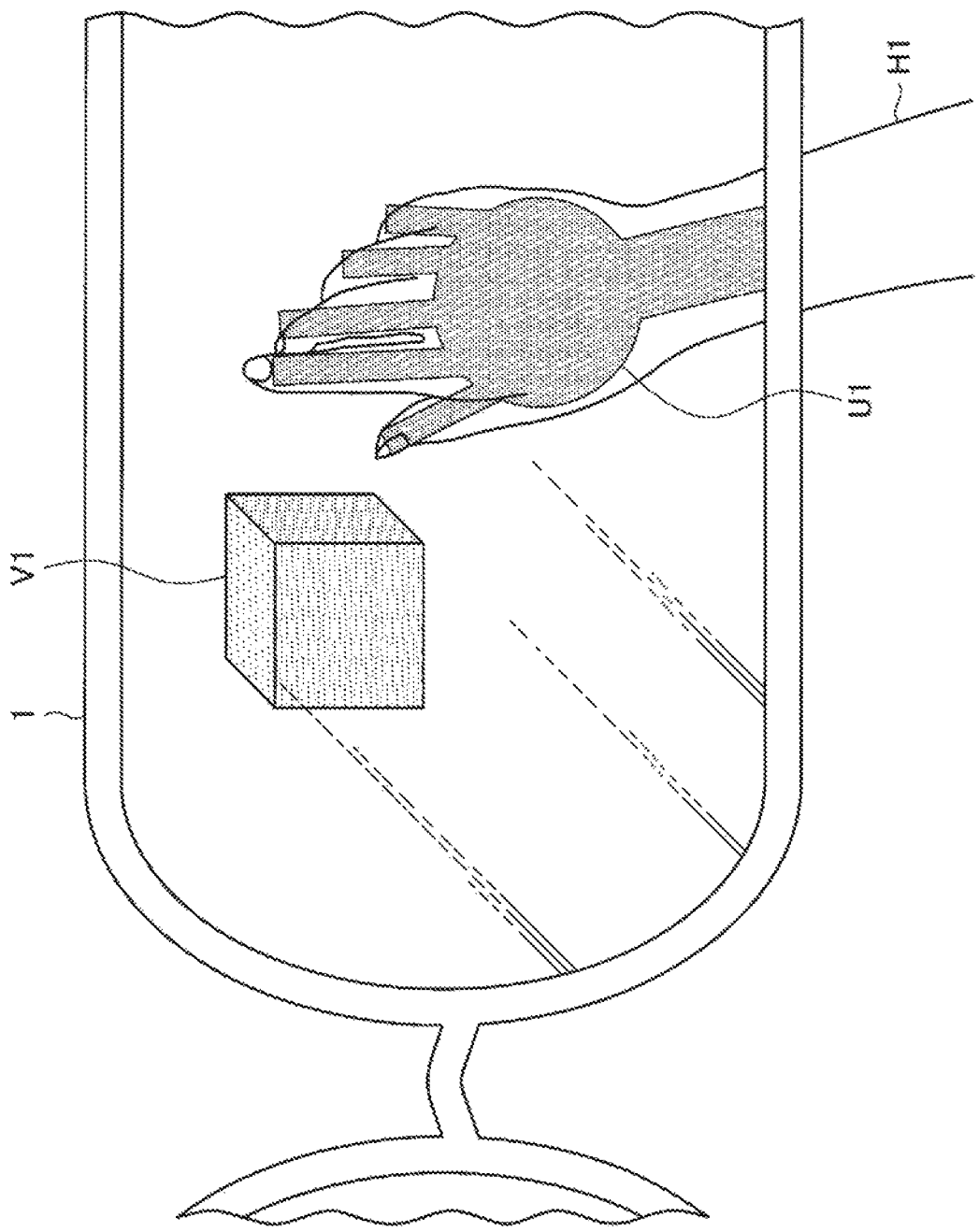
FIG. 1 is an explanatory diagram for describing an overview of an information processing apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

<<1. Overview>>
<<2. Configuration>>
<<3. Operation>>
<<4. Specific example of user operation>>
 <4-1. First specific example>
 <4-2. Second specific example>
 <4-3. Third specific example>
 <4-4. Fourth specific example>
<<5. Exemplary hardware configuration>>
<<6. Conclusion>>

1. OVERVIEW

Technology according to the present disclosure is applicable to apparatus of various forms. FIG. 1 is an explanatory diagram for describing an overview of an information processing apparatus according to an embodiment of the present disclosure. In the example illustrated in FIG. 1, the information processing apparatus 1 is a head-mounted display (HMD). The information processing apparatus 1 is worn on the user's head, and includes a see-through display unit disposed in front of one or both of the user's eyes.

The information processing apparatus 1 according to the present embodiment includes a sensor unit (not illustrated) that executes sensing, and recognizes an operation by the user. For example, the information processing apparatus 1 is provided with a camera, which is disposed such that the rear axis is approximately parallel to the user's line of sight, and which acquires an image overlapping the user's field of view, as the sensor unit. A user operation may be recognized on the basis of the acquired image. For example, the user operation may be performed using an operating body such as the user's own hand or finger, a real object gripped by the hand, a foot, or the like. Also, the user operation may be performed using line of sight or speech as described later.

In the example of FIG. 1, on the display unit of the information processing apparatus 1, there are displayed a virtual object, namely a virtual object VI, and a user interface U1 that indicates a recognition result of the user's hand, namely an operating body H1. In the case in which the user looks through the transmissive display unit, the user interface U1 is displayed as though superimposed onto the operating body 141 as illustrated in FIG. 1.

Like the user interface U1 illustrated in FIG. 1, the operating body H1 is recognized as including five independently operable fingers, and a variety of operations may be realized.

In the information processing apparatus 1 as described above, the recognition accuracy related to the operation body H1 and user operations using the operating body H1 is lowered in some cases due to the user's state, the surrounding environment, the device performance, and the like. For example, if the image used for recognition is acquired in a dark location, the recognition accuracy of the position and facing of each finger of the operation body H1 becomes lower in some cases. As a result, there is a risk that the user's intended operation may not be recognized, and a process may not be executed, or a process different from the process intended by the user may be executed. Accordingly, in the next section, a mechanism enabling operation by user operations (an operation method) depending on the recognition accuracy will be described.

Note that although FIG. 1 illustrates an example in which the information processing apparatus 1 is an HMD and includes a see-through display unit, the information processing apparatus 1 according to the present embodiment is not limited to such an example, and may be realized in a variety of forms insofar as the information processing apparatus 1 is an apparatus capable of recognizing user operations on the basis of sensing. For example, the display unit included in the information processing apparatus 1 may be see-through or non-see-through. Also, the information processing apparatus 1 may be a helmet-style or a car windshield-style (head-up display) display device. Also, the information processing apparatus 1 may be a tabletop-style display device in which an image is projected onto a flat surface such as a table by a projection apparatus such as a projector. Also, the information processing apparatus 1 may be a personal computer (PC), a smartphone, a tablet PC, a portable/personal navigation device (PND), or the like.

2. CONFIGURATION

Figure 2:
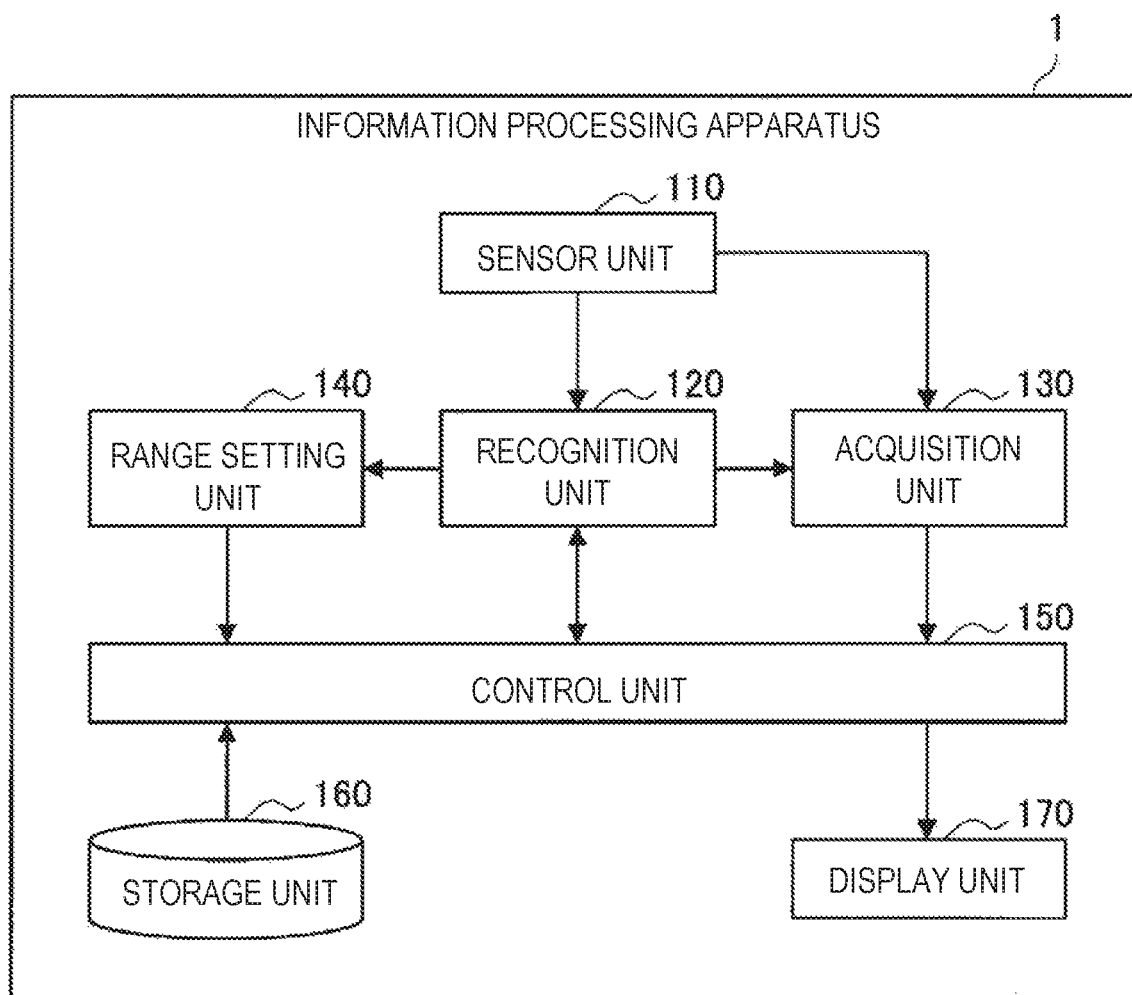
FIG. 2 is a block diagram illustrating a configuration of the information processing apparatus 1 according to the embodiment.

The above describes an overview of the information processing apparatus 1 according to the present embodiment. Next, an exemplary configuration of the information processing apparatus 1 according to an embodiment of the present disclosure will be described with reference to FIG. 2. FIG. 2 is a block diagram illustrating a configuration of the information processing apparatus 1 according to the present embodiment. As illustrated in FIG. 1, the information processing apparatus 1 is an information processing apparatus provided with a sensor unit 110, a recognition unit 120, an acquisition unit 130, a range setting unit 140, a control unit 150, a storage unit 160, and a display unit 170.

The sensor unit 110 executes sensing related to the user and the environment in which the user is placed, and acquires a sensing result (sensing data). For example, the sensor unit 110 may include a camera that acquires a captured image by imaging a real space using an image sensor such as a charge-coupled device (CCD) or a complementary metal-oxide semiconductor (CMOS) sensor. Additionally, the sensor unit 110 may also include a stereo camera that includes multiple image sensors and acquires multiple images at the same time. In such a case, the multiple image sensors may be lined up horizontally, and by having the recognition unit 120 described later analyze the multiple acquired images by a stereo matching method or the like, it is possible to acquire three-dimensional shape information (depth information) about the real space.

Obviously, the sensor unit 110 is not limited to a camera, and may include various sensors. For example, the sensor unit 110 may also include various sensors such as a microphone, a Global Positioning System (GPS) sensor, an acceleration sensor, a vision (such as line of sight, gaze point, focal point, or blink) sensor, a biological (such as heart rate, body temperature, blood pressure, or brain wave) sensor, a gyro sensor, an illuminance sensor, or an infrared camera. The sensor unit 110 provides acquired sensing data to the recognition unit 120 and the acquisition unit 130.

The recognition unit 120 analyzes the sensing data acquired by the sensing of the sensor unit 110, and recognizes (acquires) various information. For example, the recognition unit 120 may recognize user information related to the user, as well as environment information related to the environment in which the user is placed, on the basis of the sensing data.

Herein, the user information may also include activity information indicating user activity, motion information indicating user motion, biological information, regard information, and the like, for example. Activity information is information indicating the user's current activity, such as being still, walking, running, driving an automobile, ascending or descending stairs, or the like, for example, and may be recognized by analyzing sensing data such as acceleration acquired by the sensor unit 110. Also, motion information is information such as the movement speed, the movement direction, the movement acceleration, approaching a position of content, and the like, and may be recognized from sensing data and the like such as acceleration and GPS data acquired by the sensor unit 110. Also, biological information is information such as the user's heart rate, body temperature and perspiration, blood pressure, pulse, respiration, blinking, eye movement, and brain waves, and may be recognized on the basis of sensing data from a biological sensor included in the sensor unit 110. Also, gaze information is information related to the gaze of the user, such as line of sight, gaze point, and eye convergence, and may be recognized on the basis of sensing data from a vision sensor included in the sensor unit 110. Note that a line of sight recognition process by the recognition unit 120 will be described later.

Also, the environment information may include information such as the surrounding state, location, illuminance, altitude, temperature, wind direction, air volume, and time, for example. Information about the surrounding state may be information about whether or not persons other than the user or automobiles exist nearby, or information such as the degree of congestion, and may be recognized by analyzing sensing data from the camera and microphone included in the sensor unit 110. Also, location information may be information indicating characteristics of the location where the user is present, such as indoors, outdoors, underwater, or in a dangerous place, for example, and may also be information indicating the significance of the location to the user, such as one's home, workplace, a familiar place, or a place one is visiting for the first time. The location information may be recognized by analyzing sensing data from the camera, microphone, GPS sensor, illuminance sensor, and the like included in the sensor unit 110. Also, information about the illuminance, altitude, temperature, wind direction, air volume, and time (for example, GPS time) similarly may be recognized on the basis of sensing data acquired by various sensors included in the sensor unit 110.

Additionally, the recognition unit 120 may also analyze a captured image acquired by the camera included in the sensor unit 110, and execute a recognition process of a real object such as an operating body existing in the real space. The recognition unit 120 matches image features extracted from the captured image for example to known image features of a real object (for example, an operating body such as a hand) stored in the storage unit 160 described later, and thereby identifies the real object in the captured image, and recognizes the position in the captured image.

Furthermore, the recognition unit 120 may also analyze a captured image acquired by the camera included in the sensor unit 110, and acquire three-dimensional shape information about the real space. For example, the recognition unit 120 may execute a stereo matching method on multiple images acquired at the same time, a structure from motion (SfM) method on multiple images acquired chronologically, a SLAM method, or the like, and thereby recognize the three-dimensional shape of the real space, and acquire three-dimensional shape information. Also, in the case in which the recognition unit 120 is capable of acquiring three-dimensional shape information about the real space, the recognition unit 120 may also recognize the three-dimensional position, shape, size, and attitude of a real object.

In addition, the recognition unit 120 may also execute recognition of a user operation, on the basis of the sensing data and the user information. For example, the recognition unit 120 according to the present embodiment executes recognition of a gesture operation, recognition of a line-of-sight operation, recognition of a speech operation, and the like.

For example, the recognition unit 120 recognizes a gesture operation performed by the user using an operating body as follows. The gesture recognition process executed by the recognition unit 120 may include clipping a partial image including the operating body, scaling the clipped partial image, temporarily saving the partial image, calculating a difference between frames, and the like. For example, the recognition unit 120 may track attributes such as the position, shape, or size of an operating body obtained by the process described above, and by matching temporal changes of these attributes to known gesture patterns stored in advance in the storage unit 160, recognize a gesture operation expressed by the operating body. Also, in this specification, the term gesture is taken to include static poses (shapes) which do not involve temporal changes of the attributes of the operating body. Note that several non-limiting specific examples of gesture operations recognized by the recognition unit 120 will be described later using the diagrams.

In addition, the recognition unit 120 recognizes a line-of-sight operation by the user's line-of-sight position as follows. For example, by associating the positions of light spots indicating the reflections of infrared light irradiating the user's pupil by multiple infrared. 1 with the known positions of the infrared LEDs, the recognition unit 120 may recognize a line-of-sight position used in a line-of-sight operation. Note that the positions of the light spots indicating the reflections of infrared light may be detected by the sensor unit 110, or detected by the recognition unit 120 from an image obtained by imaging the pupil with the infrared camera included in the sensor unit 110. In addition, the recognition unit 120 may also recognize a line-of-sight operation by matching the line-of-sight position or the locus of a line of sight obtained by chronologically tracking the line-of-sight position with known line-of-sight patterns stored in the storage unit 160. Note that several non-limiting specific examples of line-of-sight operations using line-of-sight position recognized by the recognition unit 120 will be described later using the diagrams.

In addition, the recognition unit 120 recognizes a speech operation by the user's speech as follows. For example, the recognition unit 120 may recognize a speech operation by matching input speech acquired by the microphone included in the sensor unit 110 with known speech patterns stored in the storage unit 160. The speech input by the user by a speech operation may be a predetermined speech command (such as Yes/No), words or a keyword, or sentences such as conversation with an agent displayed on the display unit 170. Note that several non-limiting specific examples of speech operations recognized by the recognition unit 120 will be described later using the diagrams.

Note that with regard to information related to user operations (such as gesture patterns, line-of-sight patterns, and speech patterns) stored in the storage unit 160, appropriate information corresponding to a user operation specified by the control unit 150 described later may also be provided to the recognition unit 120 through the control unit 150.

The acquisition unit 130 includes an acquisition function of acquiring a recognition accuracy related to the recognition of the user information and user operation. For example, the acquisition unit 130 may specify the recognition accuracy on the basis of a confidence level of the recognition executed by the recognition unit 120, and the error or accuracy of sensing data estimated from the sensing data used to recognize an operation.

For example, in the recognition of an operating body used in a gesture operation, since confidence in the recognition result of the operating body tends to be greater as more feature points are detected from an image, the confidence level of the recognition of a gesture operation may be the number of feature points. Also, the confidence level of the recognition of a gesture operation may be a matching score in the matching between temporal changes of recognized attributes of the operating body and a known gesture pattern.

Also, as described above, since the line-of-sight position used in a line-of-sight operation is recognized on the basis of light spots detected by the recognition unit 120 from inside the user's pupil, confidence in the estimation result of the line-of-sight position tends to be greater as more light spots are detected. Consequently, the confidence level of the recognition of a line-of-sight operation may be the number of light spots detected inside the user's pupil. Additionally, the confidence level of the recognition of a line-of-sight operation may also be the difference between line-of-sight positions recognized from each of the left and right eyes.

In addition, the confidence level of the recognition of a speech operation may be, for example, the smallness of noise estimated by commonly known noise estimation technology from the input speech, or a matching score in the matching between the input speech and a known speech pattern.

As described above, by specifying the recognition accuracy on the basis of a confidence level, the recognition accuracy reflects the degree of confidence in the recognition result, and usability for the user is raised due to the selection of a user operation depending on the recognition accuracy.

In addition, the error and accuracy of the sensing data may be estimated by various methods. For example, the acquisition unit 130 may compute the variance of the sensing data over a predetermined length of time in the past, and in the case in which the variance is large, or in the case of a large change in the variance, the error may be estimated to be large (the accuracy is low). By specifying the recognition accuracy on the basis of the error or accuracy of the sensing data, the recognition accuracy reflects the accuracy of recognition as a result, and usability for the user is raised due to the selection of a user operation depending on the recognition accuracy.

The confidence level, error, or accuracy described above may be used individually or combined to specify the recognition accuracy. Also, the method of specifying the recognition accuracy by the acquisition unit 130 is not limited to the above, and may also be specified by a variety of methods in accordance with the obtained sensing data and the user operation.

Note that the acquisition of the recognition accuracy by the acquisition unit 130 is not limited to acquisition by the specification of the recognition accuracy as described above. For example, the recognition unit 120 may also specify the recognition accuracy described above during the course of the recognition process, and the acquisition unit 130 may acquire the recognition accuracy by receiving the recognition accuracy from the recognition unit 120.

In addition, in the present embodiment, although an example of acquiring the recognition accuracy based on sensing data acquired by the sensor unit 110 included in the information processing apparatus 1 is described, the present disclosure is not limited to such an example. For example, the information processing apparatus 1 may also cooperate with another sensor apparatus, and use sensor data and recognition results obtained from the sensor apparatus instead of, or in addition to, the sensing data from the sensor unit 110 and the recognition result based on the sensing data. In such a case, the acquisition unit 130 may also be an interface that acquires a recognition result specified by the sensor apparatus from the sensor apparatus, for example.

The range setting unit 140 sets ranges to use in the specification of an operating method by the control unit 150 described later. The range setting unit 140 may set a predetermined number of ranges using one or multiple threshold values. For example, by having the range setting unit set a single threshold value, a first range equal to or greater than the threshold value, and a second range less than the threshold value, that is, a second range whose upper limit value is less than or equal to a lower limit value of the first range, may be set. Also, similarly, by having the range setting unit set two threshold values, a first range, a second range whose upper limit value is less than or equal to a lower limit value of the first range, and a third range whose upper limit value is less than or equal to a lower limit value of the second range, may be set. Note that in the following, the upper limit value of the second range being less than or equal to the lower limit value of the first range may be expressed in some cases by stating that the first range is higher than the second range, that the second range is lower than the first range, or the like.

In addition, the range setting unit 140 may set ranges by using a predetermined threshold value, or set ranges by using a dynamically obtained threshold value. In the case in which the threshold value is predetermined, for example, the developer of the information processing apparatus 1 or the developer of an application executed by the information processing apparatus 1 may specify a threshold value in advance in accordance with interaction.

Also, in the case in which the threshold value is dynamically obtained, for example, the range setting unit 140 may specify the threshold value such that the threshold value becomes larger (the simple operating method is selected more easily by the control unit 150 described later) as the conditions become harsher for the user (for example, conditions in which operation or visual perception is difficult). For example, the range setting unit 140 may set ranges by specifying a threshold value on the basis of the user information related to the user or the environment information related to the environment in which the user is placed.

For example, the range setting unit 140 may specify a threshold value in accordance with information about the movement speed of the user (one example of the user information), and specify the threshold value such that the threshold value becomes larger as the movement speed of the user becomes faster. In addition, the range setting unit 140 may specify a threshold value in accordance with biological information of the user (one example of the user information), such as the heart rate of the user, for example, and specify the threshold value such that the threshold value becomes larger as the heart rate of the user becomes higher. Also, the range setting unit 140 may specify a threshold value in accordance with information about the illuminance around the user (one example of the environment information), and specify the threshold value such that the threshold value becomes larger as the illuminance around the user becomes darker. Also, the range setting unit 140 may specify a threshold value in accordance with information about the degree of congestion around the user (one example of the environment information), and specify the threshold value such that the threshold value becomes larger as the degree of congestion around the user becomes greater. Also, the range setting unit 140 may specify a threshold value in accordance with the distance from the information processing apparatus 1 to the operating body, and specify the threshold value such that the threshold value becomes larger as the distance becomes larger. According to such a configuration, in the case in which operation or vision is difficult, if the recognition accuracy is lowered, a simpler selection method is selected more easily, and the user becomes able to perform operations with an operating method corresponding to the conditions. As a result, repetition of the same operation because the operation is not recognized can be reduced, and the user is able to perform operations comfortably.

The control unit 150 includes a control function of controlling each unit included in the information processing apparatus 1. In particular, the control unit 150 according to the present embodiment specifies an appropriate user operation (operating method) on the basis of the recognition accuracy acquired by the acquisition unit 130 and the ranges set by the range setting unit 140 and controls the execution of a corresponding process in the case in which the user operation is recognized.

For example, the control unit 150 may control the recognition unit 120 and make it possible to recognize a first user operation in the case in which the recognition accuracy is included in the first range. Also, the control unit 150 may control the recognition unit 120 and make it possible to recognize a second user operation, which is different from the first user operation and related to the first user operation, in the case in which the recognition accuracy is included in the second range different from the first range. Note that the control of the recognition unit 120 by the control unit 150 is not limited to the above, and for example, in the case in which the range setting unit 140 sets three or more ranges, the control unit 150 may execute similar control on the basis of the recognition accuracy and the three or more ranges.

In the present disclosure, the second user operation being related to the first user operation may include, for example, the first user operation and the second user operation being user operations recognized on the basis of sensing data related to the same target. For example, the first user operation and the second user operation both may be recognized on the basis of sensing data related to the user's hands, fingertips, line of sight, or speech. According to such a configuration, even if the user operation received by the control unit 150 changes, the user does not have to change the target to be sensed by the sensor unit 110, and is able to continue performing operations smoothly.

Also, in the present disclosure, the second user operation being different from the first user operation may also include, for example, the recognition unit 120 recognizing the first user operation and the second user operation as different operations. For example, the above include the first user operation being recognized as an operation using an operating body that includes five independently operable fingers, the second user operation being recognized as an operation using an operating body that does not include fingers (fingers are not recognized), and the first user operation and the second user operation are different.

Also, in the case in which a user operation is recognized by the recognition unit 120, the control unit 150 may cause a predetermined process to be executed on the basis of the user operation. For example, the types of processes which may be executed on the basis of a user operation which is recognizable in the case in which the recognition accuracy is included in the first range may include types of processes which may be executed on the basis of a user operation which is recognizable in the case in which the recognition accuracy is included in the second range. Also, the user operation which is recognizable in the case in which the recognition accuracy is included in the first range may be a more complex operation than the user operation which is recognizable in the case in which the recognition accuracy is included in the second range. According to such a configuration, even in the case in which the recognition accuracy is low, the user is able to cause a process to be executed with a simple user operation, while in addition, in the case in which the recognition accuracy is high, the user is able to cause a variety of processes with a higher degree of freedom to be executed with complex user operations.

In addition, the control unit 150 may extract from the storage unit 160 and provide to the recognition unit 120 information regarding one or multiple user operations corresponding to the recognition accuracy, and thereby make it possible to recognize the user operation or operations. According to such a configuration, the recognition unit 120 becomes able to selectively recognize a user operation based on the recognition accuracy, and for example, compared to the case of recognizing all user operations that the recognition unit 120 could recognize, the processing load related to the recognition process is reduced.

Also, the control unit 150 may cause the user to be notified that the first user operation is recognizable in the case in which the recognition accuracy is included in the first range, and cause the user to be notified that the second user operation is recognizable in the case in which the recognition accuracy is included in the second range. For example, the control unit 150 may control the display unit 170 to display a different user interface, effect, text, or the like for each recognizable user operation, and thereby cause the user to be notified that the user operation is recognizable. Additionally, the method of notification by the control unit 150 is not limited to the above, and the control unit 150 may also control a speaker (not illustrated) to issue a notification by sound, or control a vibration unit (not illustrated) to issue a notification by vibration.

Note that specific examples of user operations, processes based on user operations, and notifications indicating that a user operation is recognizable will be described later using the diagrams.

The storage unit 160 stores programs and data for processes by the information processing apparatus 1. For example, the storage unit 160 may also store image features used to recognize an operating body, and gesture patterns, line-of-sight patterns, speech patterns, and the like used to recognize operations. The information described above stored in the storage unit 160 is provided to the recognition unit 120 through the control unit 150 in accordance with the user operation specified by the control unit 150.

The display unit 170 is a display that displays various information. As illustrated in FIG. 1, the display unit 170 may be a transmissive (optical see-through) display, or a non-transmissive display. Also, the display unit 170 may be controlled by the control unit 150 to display a notification about a recognizable user operation.

3. OPERATION

Figure 3:
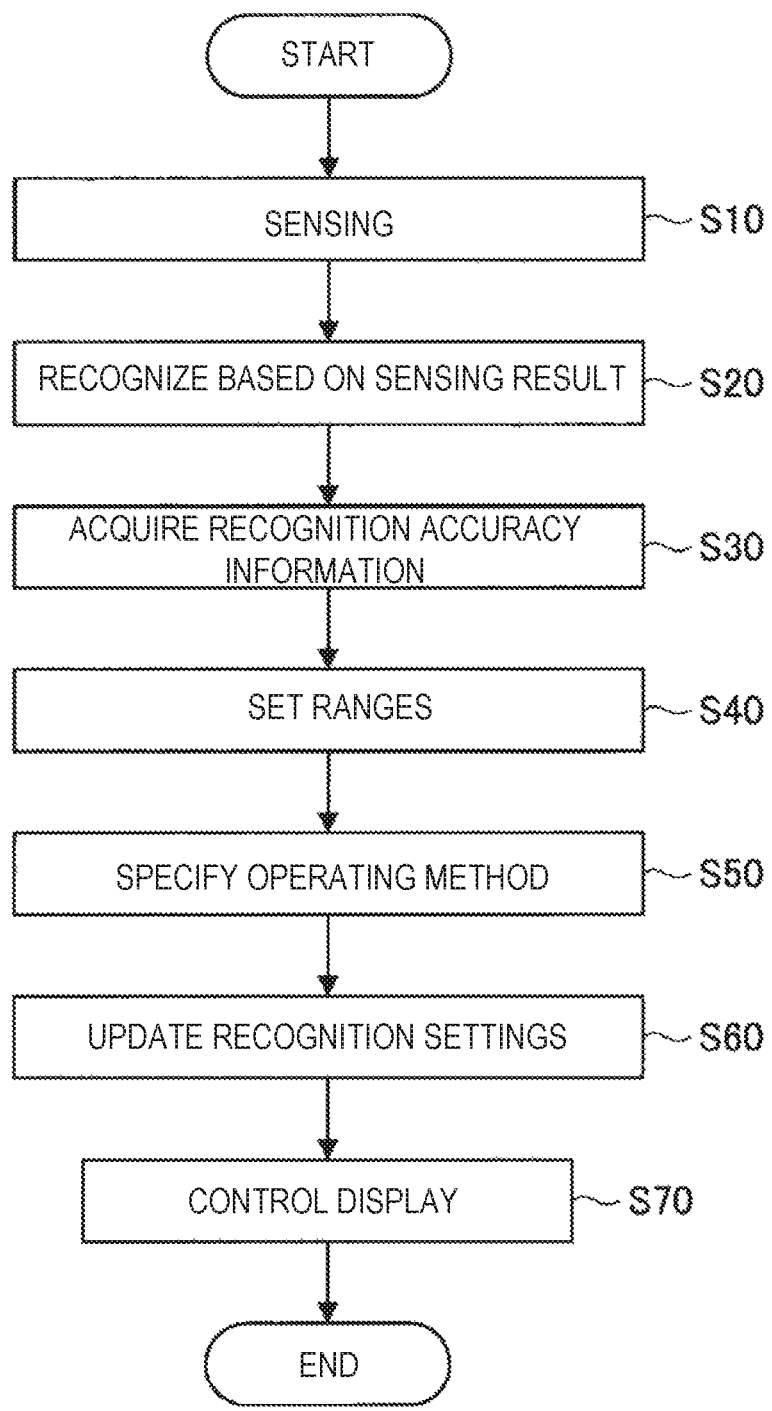
FIG. 3 is a flowchart for describing exemplary operation of the information processing apparatus 1 according to the embodiment.

The above describes an exemplary configuration of the information processing apparatus 1 according to an embodiment of the present disclosure. Next, exemplary operation of the information processing apparatus 1 according to the present embodiment will be described with reference to FIG. 3. FIG. 3 is a flowchart for describing exemplary operation of the information processing apparatus 1 according to the present embodiment.

First, sensing is executed by the sensor unit 110 (S10). Next, the recognition unit 120 analyzes the sensing result (sensing data) from the sensor unit 110, and recognizes various information, such as user information, environment information, and operation-related information (S20). Next, the acquisition unit 130 acquires recognition accuracy information on the basis of the confidence level of the recognition, the error or accuracy of the sensing data, and the like (S30).

Next, the range setting unit 140 sets ranges to be used to specify the operating method, on the basis of the user information, environment information, and the like (S40). The control unit 150 specifies the operating method (user operation) on the basis of the set ranges and the recognition accuracy (S50).

Next, the control unit 150 controls the recognition unit 120 to update the recognition settings such that operation recognition corresponding to the specified operating method is executed (S60). Additionally, the control unit 150 controls the display unit 170 to notify the user that the specified user operation (operating method) is available (S70).

Note that the series of processes described above (steps S10 to S70) may be executed repeatedly as soon as the series of processes ends, or periodically.

4. SPECIFIC EXAMPLE OF USER OPERATION

The above describes an exemplary configuration and exemplary operation of the information processing apparatus 1 according to the present embodiment. Hereinafter, several specific examples of user operations will be described.

Note that among the specific examples described hereinafter, any one specific example may be applied to the present embodiment, or multiple specific examples may be combined and applied to the present embodiment. Also, among the specific examples described hereinafter, any one may also be selected by the user or automatically and applied to the present embodiment.

4-1. First Specific Example

Figure 4A:
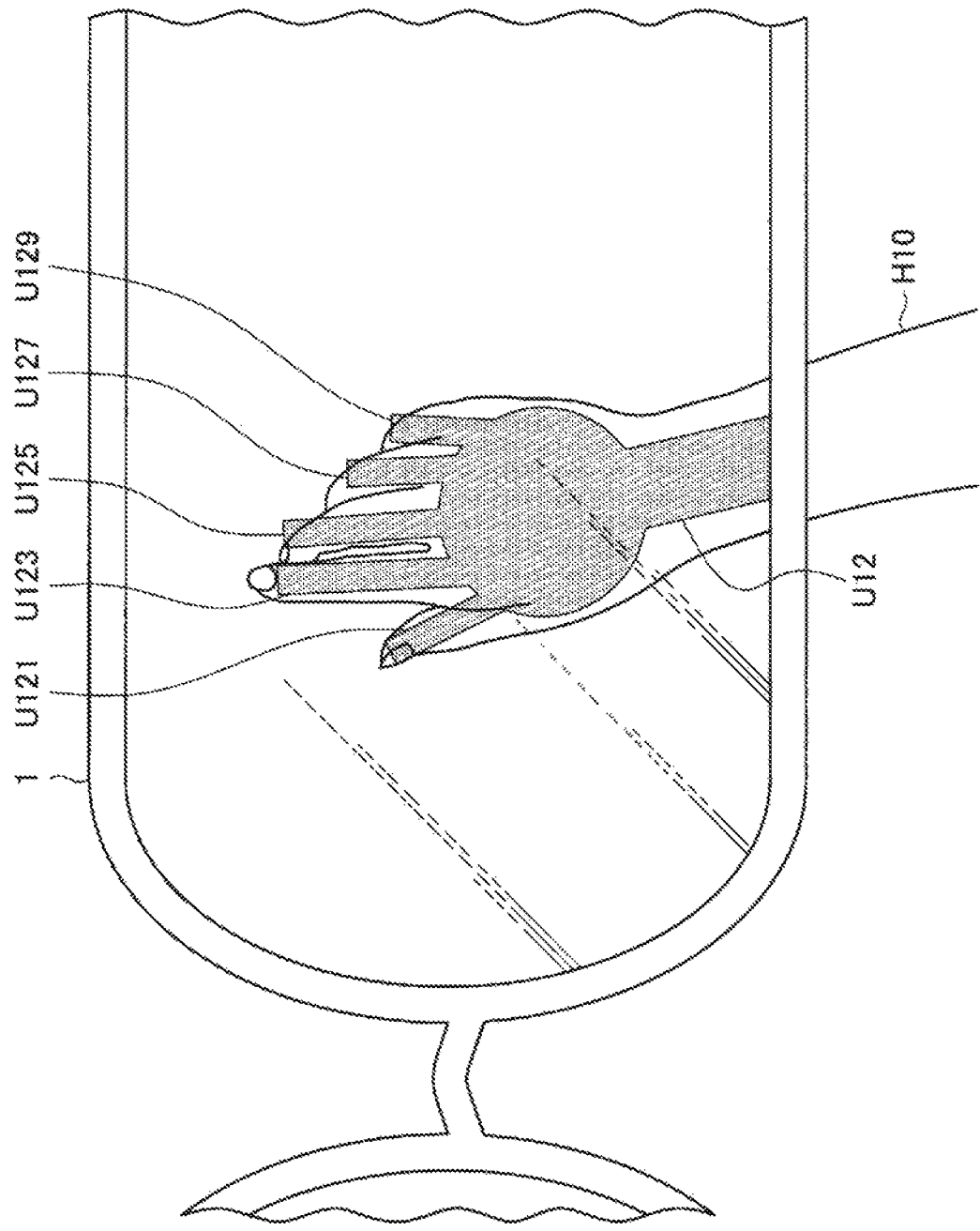
FIG. 4A is an explanatory diagram for describing a first specific example of a user operation according to the embodiment.
Figure 4B:
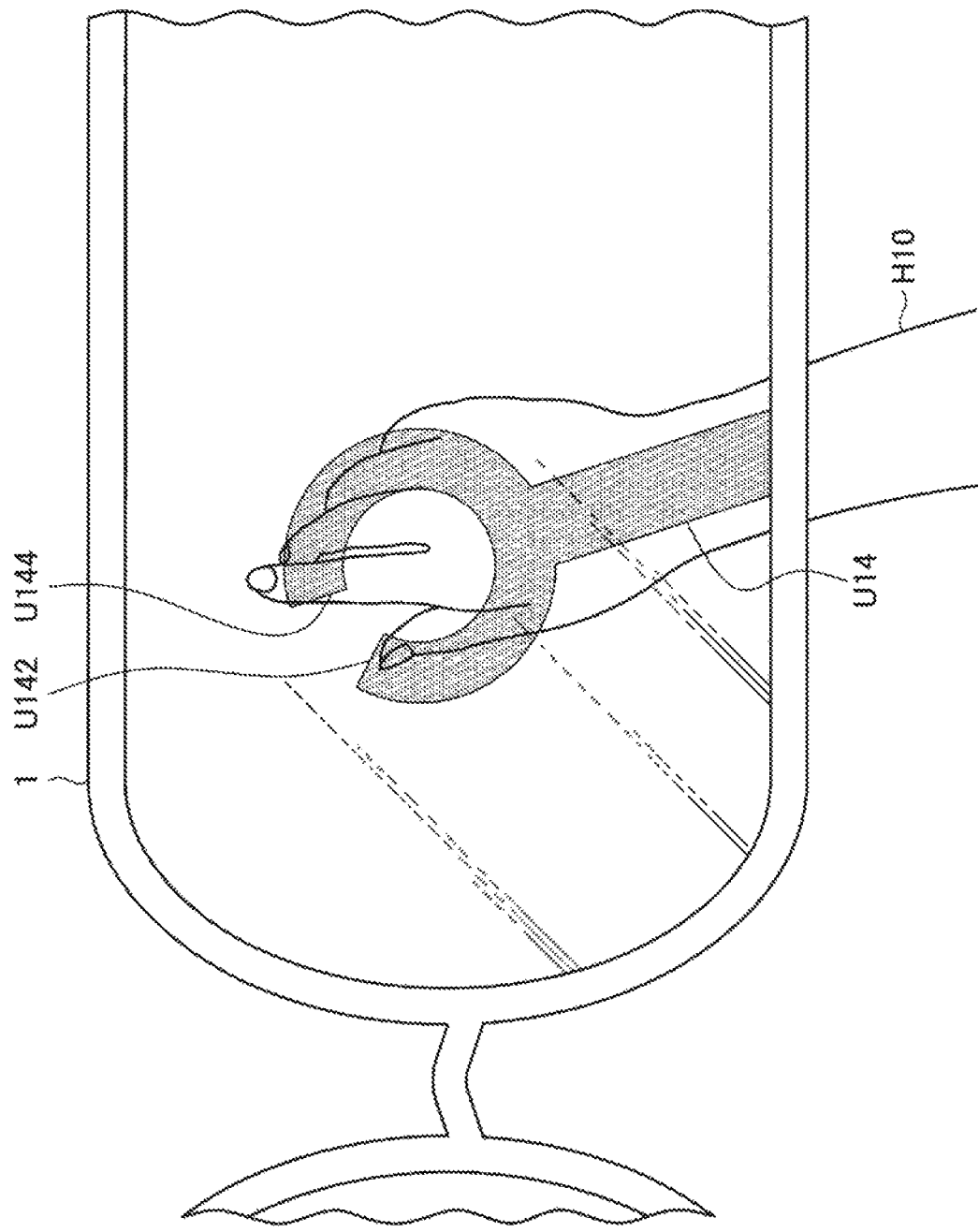
FIG. 4B is an explanatory diagram for describing the first specific example of the user operation according to the embodiment.
Figure 4C:
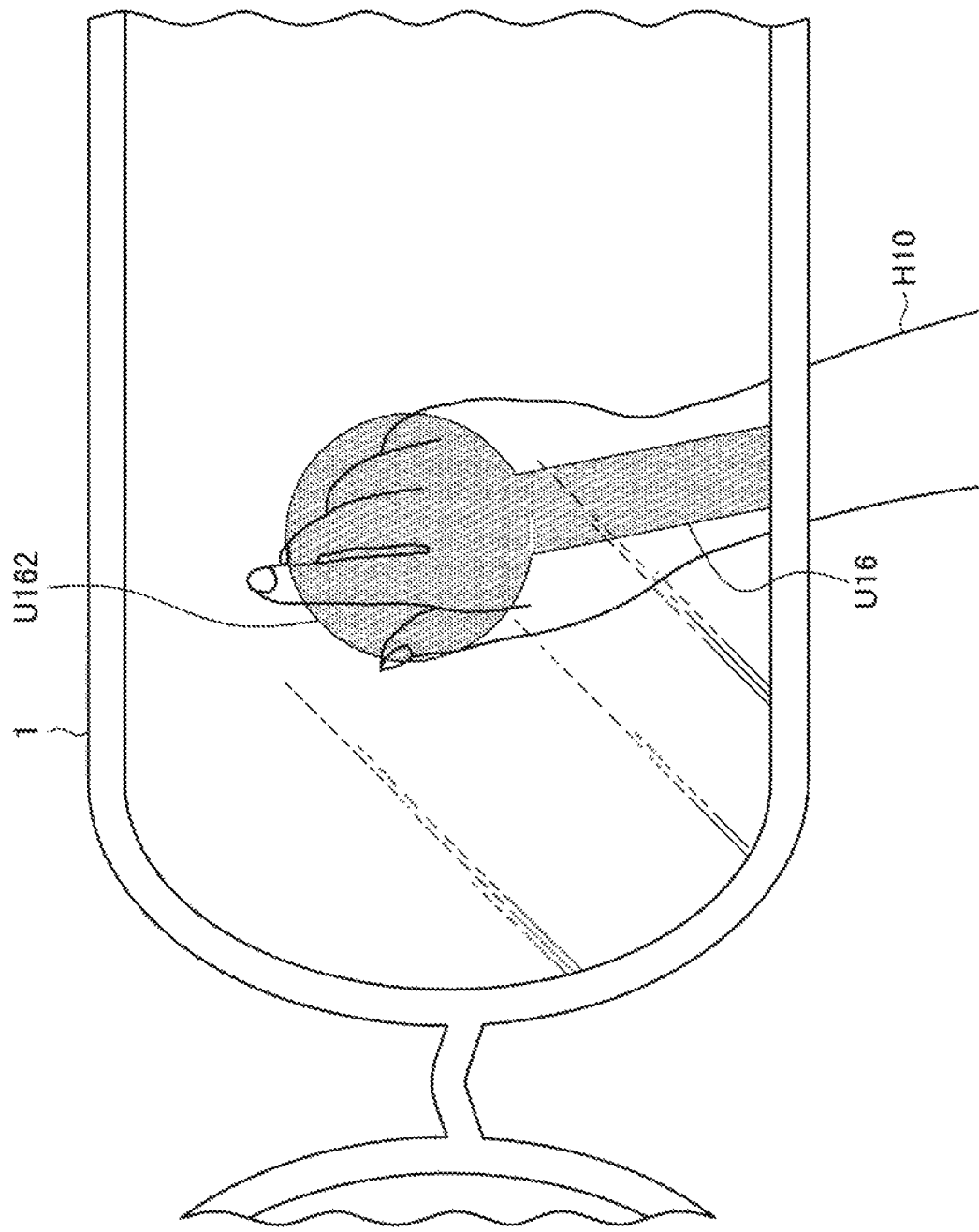
FIG. 4C is an explanatory diagram for describing the first specific example of the user operation according to the embodiment.

FIGS. 4A to 4C are explanatory diagrams for describing a first specific example of a user operation according to the present embodiment. In this specific example, each user operation is a user operation recognized on the basis of sensing data related to the user's hand (one example of an operating body), and the number of recognized fingers is different depending on the recognition accuracy. Also, this specific example assumes that the range setting unit 140 sets three ranges which go lower in the order of the first range, the second range, and the third range (the lower limit value of the second range is less than or equal to the upper limit value of the first range, and the lower limit value of the third range is less than or equal to the upper limit value of the first range).

FIG. 4A is an explanatory diagram for explaining a user operation which is recognizable in the case in which the recognition accuracy is included in the first range in this specific example. In the example illustrated in FIG. 4A, on the display unit 170 of the information processing apparatus 1, a user interface U12 indicating a recognition result of an operating body H10, namely the user's hand, is displayed. In this specific example, the display unit 170 is a transmissive display, and in the case in which the user looks through the display unit 170, the user interface U12 is displayed as though superimposed onto the operating body H10 as illustrated in FIG. 4A.

Also, as illustrated in FIG. 4A, the user interface U12 is displayed including five independently operable fingers U121 to U129, and the user may realize a variety of operations. For example, by performing predetermined gesture operations using the operating body H10, the user may cause the information processing apparatus 1 to execute processes such as editing, making a selection related to viewing, moving, enlarging or reducing, rotating, transforming, and the like with respect to a virtual object (not illustrated). The virtual object to be operated may be a 3D model, for example, but may also be content including a graphical user interface (GUI) such as icons, buttons, or a control panel, images such as photographs and illustrations, and text such as explanations and labels.

For example, by performing a gesture of tapping a virtual object with a finger, the user is able to select the virtual object. Also, by performing a gesture of pinching and moving a virtual object with two fingers, the user is able to grab and move the virtual object. Also, by overlapping five fingers onto a virtual object, and opening or closing the fingers, the user is able to enlarge or reduce the virtual object. Also, by performing a gesture of transforming a virtual object, such as pushing, pulling, twisting, dividing up, or breaking the virtual object with one or multiple fingers, the user is able to transform the virtual object.

Note that the gesture operations according to the present disclosure are not limited to the above gestures, and may be any operations performed using an operating body, for example. Gesture operations according to the present disclosure may also include what are known as tapping, flicking, swiping, dragging, pinching in, pinching out, and the like.

FIG. 4B is an explanatory diagram for explaining a user operation which is recognizable in the case in which the recognition accuracy is included in the second range in this specific example. Likewise in the example illustrated in FIG. 4B, on the display unit 170 of the information processing apparatus 1, a user interface U14 indicating a recognition result of an operating body H10, namely the user's hand, is displayed as though superimposed onto the operating body H10.

As illustrated in FIG. 4B, the user interface U14 is shaped like a two-fingered arm, and in this user operation, the user's hand is recognized as an operating body including two fingers. For example, the recognition unit 120 may recognize the opening degree of the user's hand, and the control unit 150 may cause the opening degree of the user's hand to be displayed as the opening degree of the finger U142 and the finger U144 illustrated in FIG. 4B.

Also, in the example illustrated in FIG. 4B, processes of selecting and moving a virtual object may be executed on the basis of a gesture operation of tapping the virtual object with the above arm, and a gesture operation of pinching and moving the virtual object with the above arm.

FIG. 4C is an explanatory diagram for explaining a user operation in the case in which the recognition accuracy is included in the third range in this specific example. Likewise in the example illustrated in FIG. 4C, on the display unit 170 of the information processing apparatus 1, a user interface U16 indicating a recognition result of an operating body H10, namely the user's hand, is displayed as though superimposed onto the operating body H10.

As illustrated in FIG. 4C, the user interface U16 includes a round part U162 with no fingers, and in this user operation, the position of the user's hand (the operating body) is recognized, but fingers are not recognized. In the example illustrated in FIG. 4C, the user interface U16 has an adsorptive power, for example, and by moving the operating body H10 to bring the user interface U16 close to a virtual object, the user is able to cause the virtual object to adsorb onto the user interface U16. Also, by having the user move the operating body H10 to move the user interface U16, a process of moving the adsorbed virtual object may be executed. Note that to release the adsorption of the adsorbed virtual object, another user operation (for example, speech recognition) may be used.

As described above, in this specific example, the first user operation in the example illustrated in FIG. 4A and the second user operation in the example illustrated in FIG. 4B both may be user operations for causing the same process (hereinafter called the first process in some cases) to be executed. For example, the gesture operation of pinching and moving a virtual object with two fingers in the example illustrated in FIG. 4A and the gesture operation of tapping a virtual object with the arm in the example illustrated in FIG. 4A are both user operations for causing a selection process (one example of the first process) to be executed.

Also, the control unit 150 may make it possible to recognize a user operation for causing a second process different from the first process to be executed in the case in which the recognition accuracy is included in the first range, and not make it possible to recognize a user operation for causing the second process to be executed in the case in which the recognition accuracy is included in the second range. For example, in the example illustrated in FIG. 4A as described above, by overlapping five fingers onto a virtual object, and opening or closing the fingers, the user is able to execute an enlargement/reduction process (one example of the second process). On the other hand, in the example illustrated in FIG. 4B, the control unit 150 may execute control such that the user operation for causing the enlargement/reduction process to be executed is not recognized (the enlargement/reduction process cannot be executed). Obviously, similar control may also be executed for the case in which the recognition accuracy is included in the third range (the case illustrated in FIG. 4C). According to such a configuration, by limiting the recognizable user operations in the case of low recognition accuracy, it is possible to decrease false recognition. Also, in the case of high recognition accuracy, the user is able to execute a greater variety of processes with a greater variety of user operations.

Also, as described above, in this specific example, the number of fingers on the user's hand recognized in the user operation corresponding to a higher range is greater than the number of fingers on the user's hand recognized in the user operation corresponding to a lower range (a range whose upper limit value is smaller than the lower limit value of another range). By differentiating the numbers of fingers recognized in the user operations, each user operation is recognized as a different operation, and a user interface corresponding to the recognized number of fingers is displayed. According to such a configuration, the user is able to understand the hand recognition accuracy and the recognizable operations by the number of fingers indicated by the displayed user interface. Also, in the case in which the recognition accuracy is higher, the user is able to perform more complex operations, and cause processes with a higher degree of freedom to be executed.

4-2. Second Specific Example

In the first specific example described above, an example is described in which, in a user operation based on recognition of a hand, the number of recognized fingers is different depending on the recognition accuracy. Hereinafter, as a second specific example, an example will be described in which, in a user operation recognized on the basis of sensing data related to a fingertip of the user (for example, the fingertip of the index finger), an operating region that is operated is specified on the basis of the position of the fingertip, and the size of the operating region is different depending on the recognition accuracy.

Figure 5A:
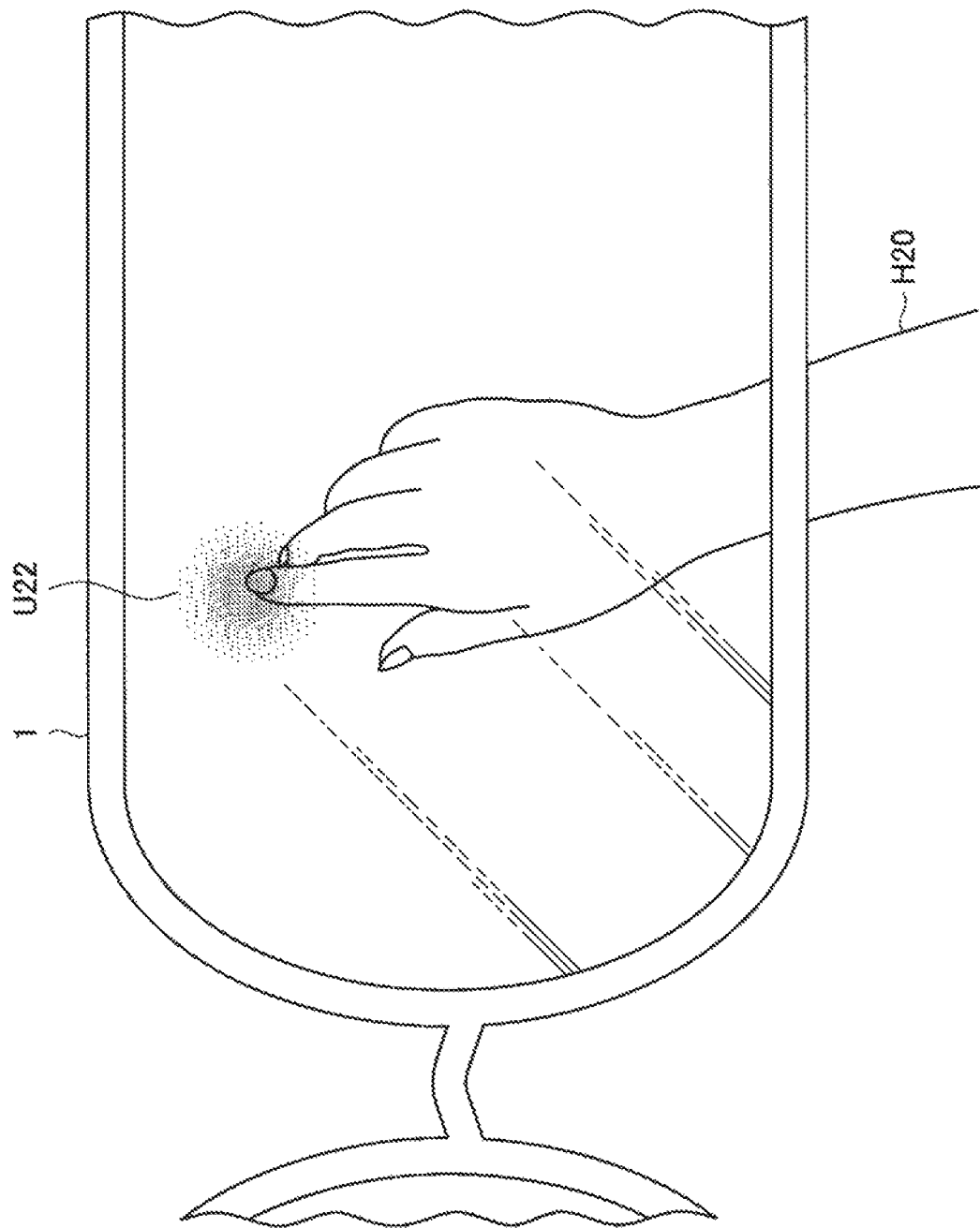
FIG. 5A is an explanatory diagram for describing a second specific example of a user operation according to the embodiment.
Figure 5B:
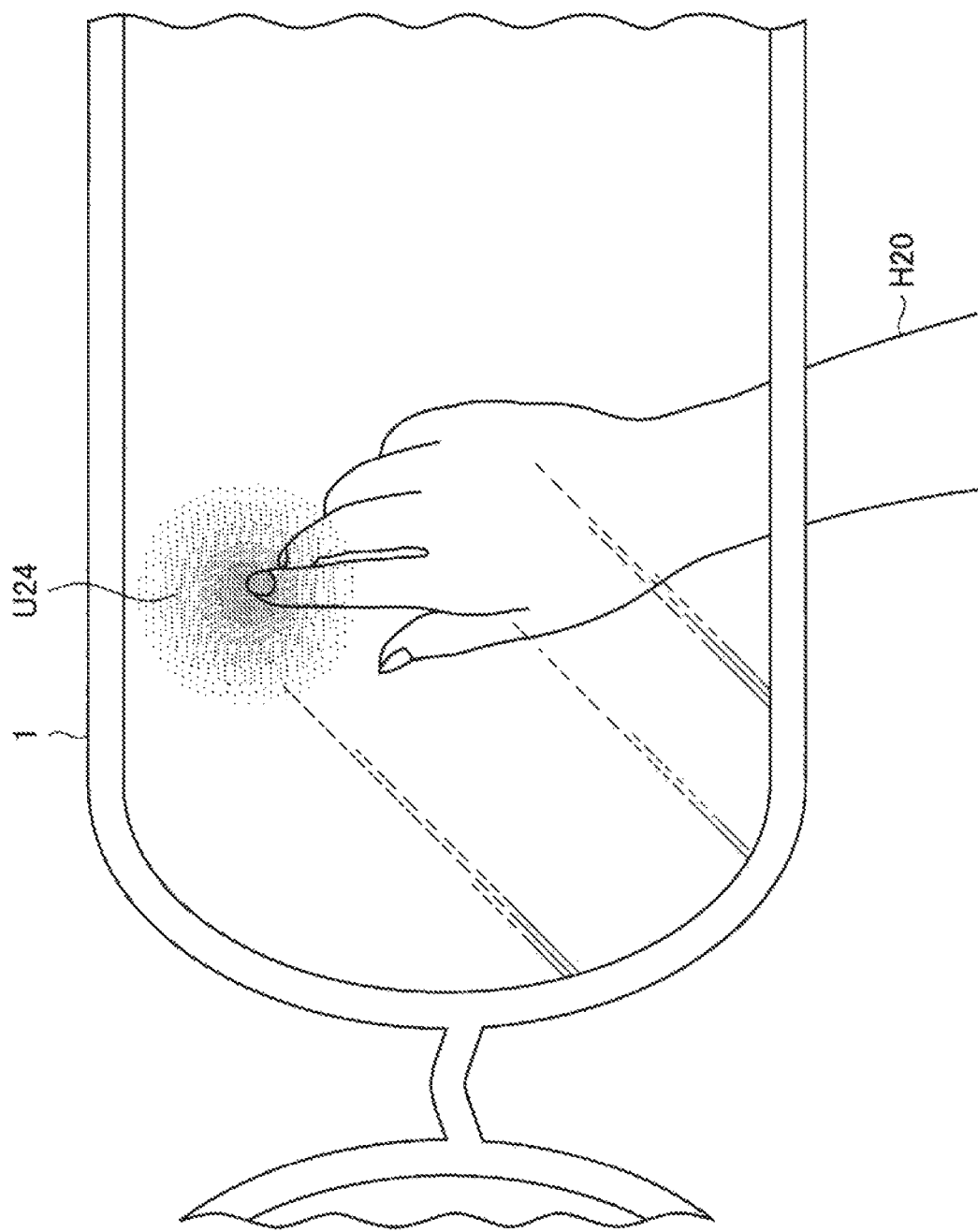
FIG. 5B is an explanatory diagram for describing the second specific example of the user operation according to the embodiment.

FIGS. 5A and 5B are explanatory diagrams for describing the second specific example of a user operation according to the present embodiment. This specific example assumes that the range setting unit 140 sets two ranges, with the second range being lower than the first range.

FIG. 5A is an explanatory diagram for explaining a first user operation in the case in which the recognition accuracy is included in the higher first range in this specific example. Also, FIG. 5B is an explanatory diagram for explaining a second user operation in the case in which the recognition accuracy is included in the second range in this specific example.

Herein, the control unit 150 may set the operating region such that the operating region that is operated in the second user operation is larger than the operating region that is operated in the first user operation. According to such a configuration, in the case of high recognition accuracy, a precise operating region matching the shape of the user's fingertip is set, making more accurate operation possible, whereas in the case of low recognition accuracy, an operating region is set over a wider region surrounding the fingertip, making discomfort due to recognition error less likely.

In addition, the control unit 150 may also cause the display unit 170 to display an operating region indicator that indicates the operating region. The operating region indicator may be displayed at a size corresponding to the size of the operating region, and may be displayed at a position corresponding to the position of the operating region. According to such a configuration, the user is able to understand the operating region.

In the examples illustrated in FIGS. 5A and 5B, on the display unit 170 of the information processing apparatus 1, a user interface (operating region indicator) U22 and a user interface (operating region indicator) U24 that indicate each operating region are displayed under the control of the control unit 150. In this specific example, the display unit 170 is a transmissive display, and in the case in which the user looks through the display unit 170, the user interface U22 and the user interface U24 are displayed as though superimposed onto the fingertip of an operating body H20 as illustrated in FIGS. 5A and 5B. In this specific example, since the operating region for the second user operation is larger than the operating region for the first user operation, the user interface U24 is larger than the user interface U22, as illustrated in FIGS. 5A and 5B.

In this specific example, for example, by having the user use the operating body H20 to perform an operation such that a virtual object remains inside the range of the user interface U22 or the user interface U24 for a predetermined amount of time, a process of selecting a virtual object may be executed. Also, in the example illustrated in FIG. 5A in the state of high recognition accuracy, the three-dimensional position of the finger may be recognized, and an incremental touch operation may be recognized according to the degree of contact (touch depth) with respect to the virtual object. In such a case, for example, a process of transforming the virtual object may be executed according to the degree of contact.

As described above, in this specific example, in the case of high recognition accuracy, a smaller operating region to be subjected to a user operation is recognized, and the control unit 150 causes a small operating region indicator that indicates the smaller operating region to be displayed. Also, in the case of low recognition accuracy, a larger operating region to be subjected to a user operation is recognized, and the control unit 150 causes a large operating region indicator that indicates the larger operating region to be displayed. By differentiating the operating regions recognized in the user operations, each user operation is recognized by the recognition unit 120 as a different operation, and a user interface corresponding to the recognized operating region is displayed. According to such a configuration, in the case of high recognition accuracy, a user interface matching the shape of the user's finger is displayed, and the user is also to understand that the fingertip position is being recognized with high accuracy, while also being able to cause processes with a high degree of freedom to be executed on the basis of complex operations. Also, in the case of low recognition accuracy, a user interface is displayed over a wider range around the fingertip, and thus user discomfort with respect to recognition error of the fingertip position is decreased. Also, since the recognizable user operation and the size of the operating region indicator correspond to each other, the user is able to understand the recognizable user operation on the basis of the size of the operating region indicator.

Note that an example in which the operating region of a fingertip and the size of an operating region indicator indicating the operating region are different is not limited to the above. For example, the operating region of the fingertip may be set smaller as the recognition accuracy becomes greater, and an operating region indicator indicating the operating region of the fingertip with a size corresponding to the operating region may also be displayed.

4-3. Third Specific Example

In the first specific example and the second specific example described above, an example is described in which the user operation is an operation based on recognition of a hand or a fingertip. Next, hereinafter, as a third specific example, an example of a user operation recognized on the basis of sensing data related to the user's line of sight will be described. In this specific example, the operating region that is operated is specified on the basis of a line-of-sight position.

Figure 6A:
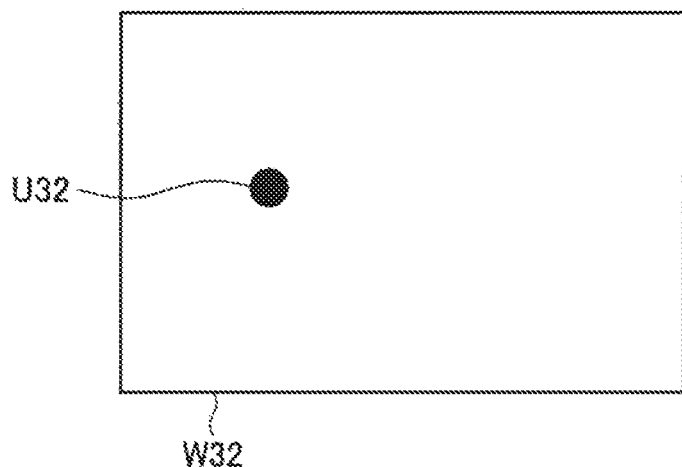
FIG. 6A is an explanatory diagram for describing a third specific example of a user operation according to the embodiment.
Figure 6B:
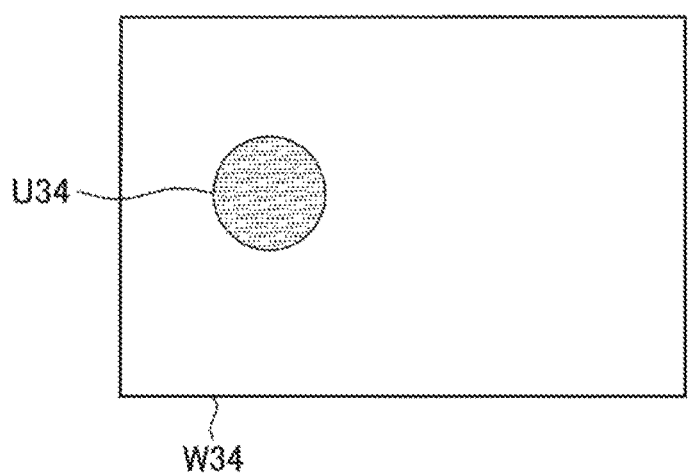
FIG. 6B is an explanatory diagram for describing the third specific example of the user operation according to the embodiment.
Figure 6C:
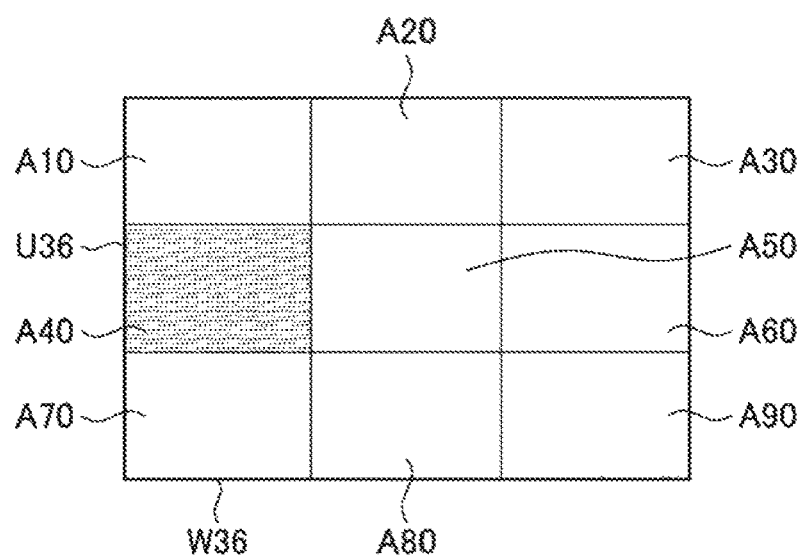
FIG. 6C is an explanatory diagram for describing the third specific example of the user operation according to the embodiment.

FIGS. 6A to 6C are explanatory diagrams for describing a third specific example of a user operation according to the present embodiment. This specific example assumes that the range setting unit 140 sets three ranges, which become lower in the order of the first range, the second range, and the third range. Also, the screens W32 to W36 illustrated in FIGS. 6A to 6C are screens displayed on the display unit 170 under control by the control unit 150. The display unit 170 may be a transmissive display or a non-transmissive display.

FIG. 6A is an explanatory diagram for explaining a user operation in the case in which the recognition accuracy is included in the first range in this specific example. In the example illustrated in FIG. 6A, on the screen W32, a user interface (operating region indicator) U32 indicating the operating region centered on the user's line-of-sight position is displayed. In the example illustrated in FIG. 6A, for example, the user moves one's line of sight to thereby move the user interface U32, and is able to cause a selection process to be executed by gazing (keeping the line-of-sight position stationary) for a fixed amount of time. For example, the user operation in FIG. 6A may be recognized by the recognition unit 120 as an operation of the user looking at a single point, and the user interface U32 may be used as what is called a pointer.

FIG. 6B is an explanatory diagram for explaining a user operation in the case in which the recognition accuracy is included in the second range in this specific example. In the example illustrated in FIG. 6B, on the screen W34, a user interface (operating region indicator) U34, which is larger than the user interface U32 illustrated in FIG. 6A, and which indicates an operating region (gaze area) centered on the user's line-of-sight position, is displayed. For example, the user operation in FIG. 6B is different from the user operation in FIG. 6A, and may be recognized by the recognition unit 120 as an operation of the user looking at a region larger than a point. In the example illustrated in FIG. 6B, the user is able to execute a process of causing the user interface U34 to move by moving one's line of sight, for example, but in order to cause a selection process to be executed, another user operation may be required (for example, an operation based on speech recognition). Note that in the case in which a virtual object exists inside the area of the user interface U34, a hint or selection options may be displayed, for example, and a selection process may be executed by having the user say "OK" in such a state, for example.

FIG. 6C is an explanatory diagram for explaining a user operation in the case in which the recognition accuracy is included in the third range in this specific example. In the example illustrated in FIG. 6C, the screen W36 is displayed divided into nine areas from A10 to A90, and a user interface (operating region indicator) U36, which is larger than the user interface U34 illustrated in FIG. 6B, and which indicates the operating region, is displayed in the area where the user's line of sight position exists. For example, the user operation in FIG. 6C is different from the user operations in FIGS. 6A and 6B, and may be recognized by the recognition unit 120 as an operation of the user looking at an even larger region. In accordance with the area in which the user interface U36 exists, an input operation corresponding to a direction such as up (area 420), down (area 480), left (area A40), right (area A60), and center (area A50), for example, may be executed. For example, in the example illustrated in FIG. 6C, since the user interface U36 is displayed in the area A40, an input operation in the left direction (a left key) is executed.

4-4. Fourth Specific Example

The above describes specific examples of user operations based on hand recognition, and user operations based on line of sight recognition. Next, hereinafter, as a fourth specific example, an example of a user operation recognized on the basis of the recognition of a speech pattern will be described.

Figure 7A:
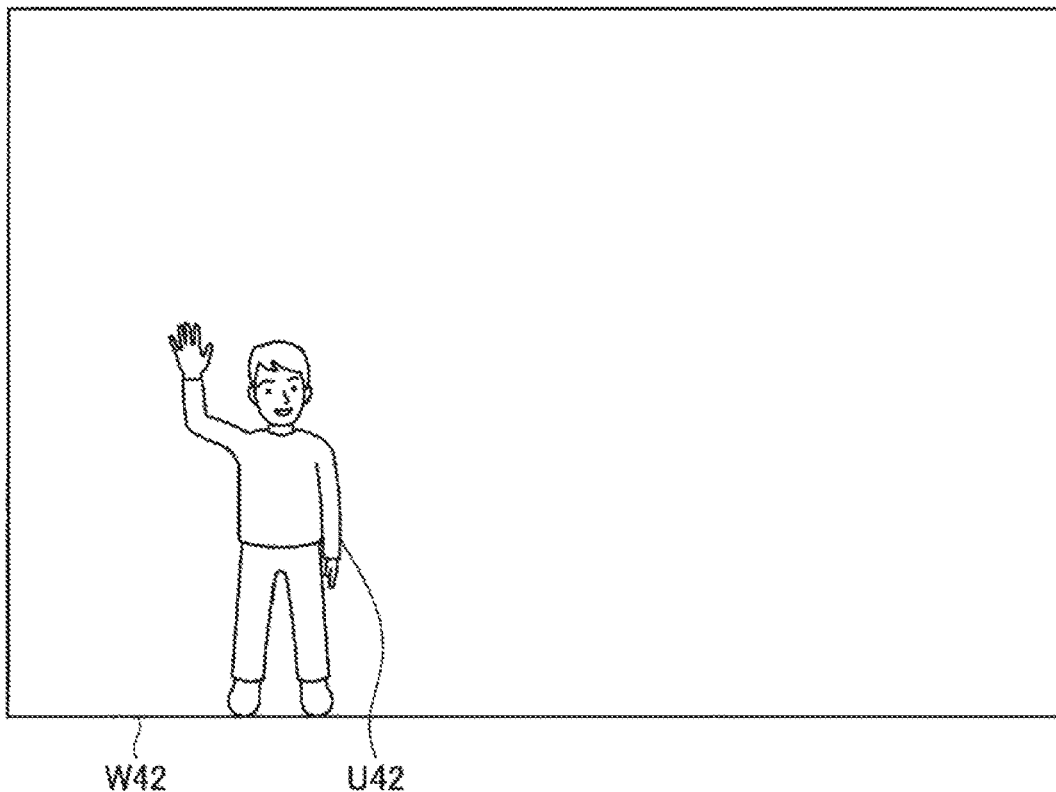
FIG. 7A is an explanatory diagram for describing a fourth specific example of a user operation according to the embodiment.
Figure 7B:
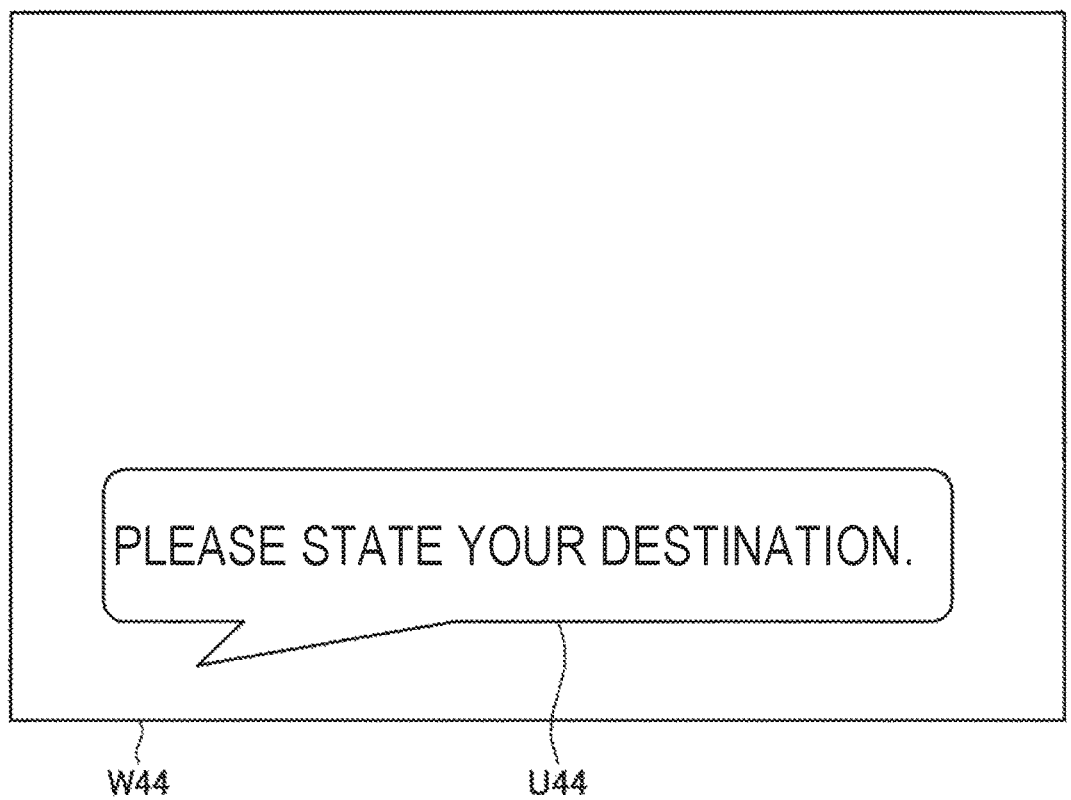
FIG. 7B is an explanatory diagram for describing the fourth specific example of the user operation according to the embodiment.
Figure 7C:
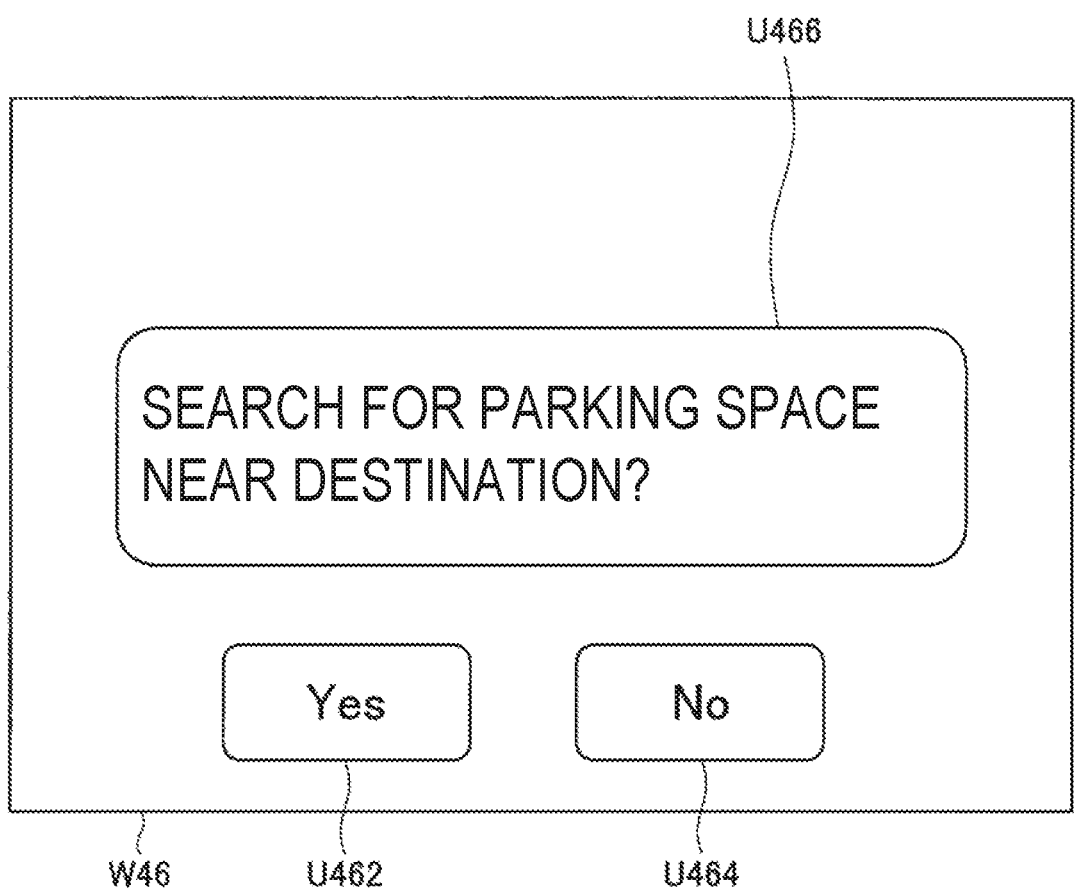
FIG. 7C is an explanatory diagram for describing the fourth specific example of the user operation according to the embodiment.

FIGS. 7A to 7C are explanatory diagrams for describing a fourth specific example of a user operation according to the present embodiment. This specific example assumes that the range setting unit 140 sets three ranges, Which become lower in the order of the first range, the second range, and the third range. Also, the screens W42 to W46 illustrated in FIGS. 7A to 7C are screens displayed on the display unit 170 under control by the control unit 150. The display unit 170 may be a transmissive display or a non-transmissive display.

FIG. 7A is an explanatory diagram for explaining a user operation in the case in Which the recognition accuracy is included in the first range in this specific example. In the example illustrated in FIG. 7A, on the screen W42, an agent (character) U42 is displayed. The user may input speech freely as though conversing with the agent U42, and the information processing apparatus 1 may output speech from a speaker (not illustrated) as though the agent U42 is talking. For example, the user operation in FIG. 7A may be recognized by the recognition unit 120 as an operation according to a sentence spoken by the user.

FIG. 7B is an explanatory diagram for explaining a user operation in the case in which the recognition accuracy is included in the second range in this specific example. In the example illustrated in FIG. 7B, on the screen W44, a user interface U44 including question text answerable by the user with words or a keyword is displayed. The user is able to perform speech input with words or a keyword, and a confirmation message of the input content may be displayed in accordance with the recognition result of the input speech. For example, the user operation in FIG. 7B is different from the user operation in FIG. 7A, and may be recognized by the recognition unit 120 as an operation according to words or a keyword spoken by the user. In the example of FIG. 7B, since the input is limited to words or a keyword, compared to the example in FIG. 7A which allows for free conversation, the number of recognized patterns of speech is reduced, making it easier to receive user input smoothly even in the case in which the recognition accuracy is lower.

FIG. 7C is an explanatory diagram for explaining a user operation in the case in which the recognition accuracy is included in the third range in this specific example. In the example illustrated in FIG. 7C, on the screen W46, user interfaces U462 and U464 including predetermined speech commands, such as Yes/No, and a user interface U466 including question text answerable by the user with the speech commands, are displayed. The user is able to perform speech input with the predetermined speech commands. For example, the user operation in FIG. 7C is different from the user operations in FIGS. 7A and 7B, and may be recognized by the recognition unit 120 as an operation according to a predetermined speech command spoken by the user. In the example of FIG. 7C, since the input is limited to predetermined speech commands, compared to the examples of FIGS. 7a and 7B, the number of recognized patterns of speech is reduced further, making it easier to receive user input smoothly even in the case in which the recognition accuracy is lower.

Note that in the above, an example is described in which a notification related to the user operation is issued by the display of a user interface including question text, for example, but a notification may also be issued by outputting similar question text as speech.

5. HARDWARE CONFIGURATION EXAMPLE

Heretofore, each embodiment of the present disclosure has been described. Information processing such as the display mode selection process and the display control process described above is realized through the cooperation of software, and the hardware of the information processing apparatus 1 described below.

Figure 8:
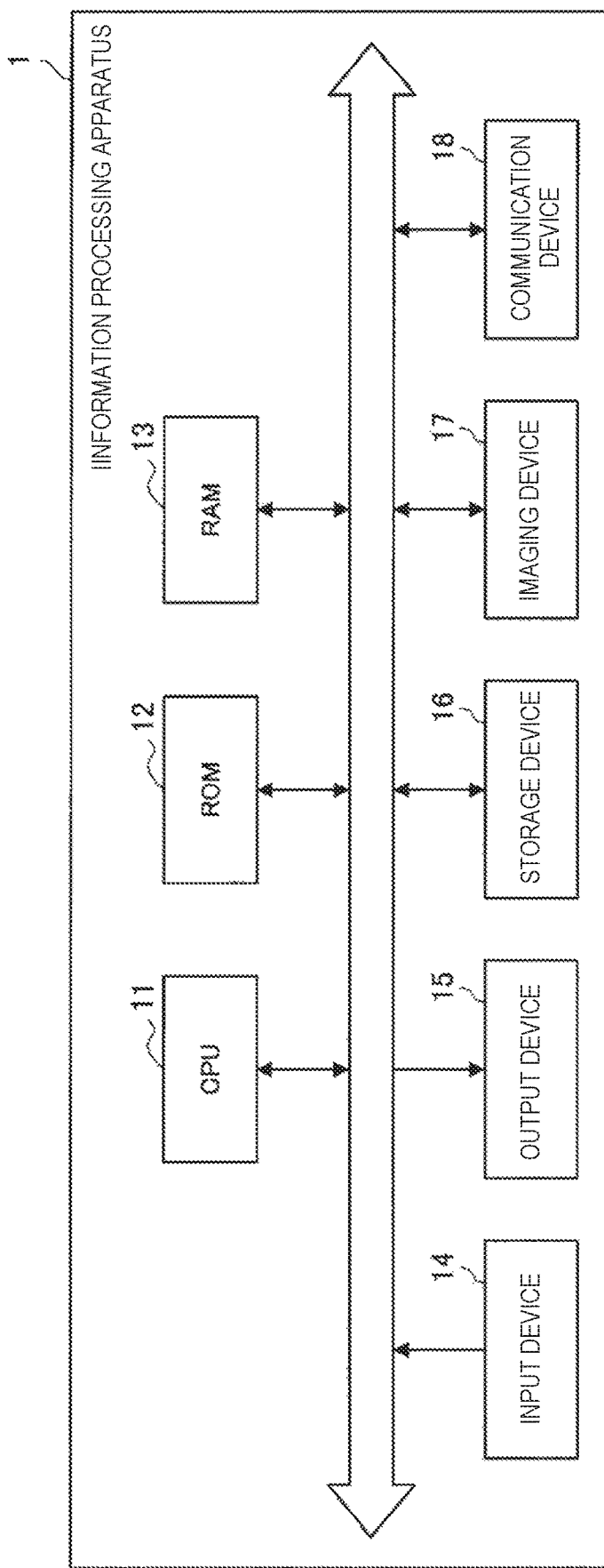
FIG. 8 is an explanatory diagram illustrating an example of a hardware configuration of the information processing apparatus according to the present disclosure.

FIG. 8 is an explanatory diagram illustrating an example of a hardware configuration of the information processing apparatus 1. As shown in FIG. 8, the information processing apparatus 1 includes a central processing unit (CPU) 11, read-only memory (ROM) 12, random access memory (RAM) 13, an input device 14, an output device 15, a storage device 16, an imaging device 17, and a communication device 18.

The CPU 11 functions as an operation processing device and a control device, and controls the overall operation in the information processing apparatus 1 in accordance with various programs. The CPU 11 may also be a microprocessor. The ROM 12 stores programs, operation parameters and the like used by the CPU 11. The RAM 13 temporarily stores programs used in the execution by the CPU 11, parameters that change appropriately in that execution, and the like. These are connected together by a host bus including a CPU bus or the like. The functions of the recognition unit 120, the acquisition unit 130, the range setting unit 140, and the control unit 150 are realized mainly through software working in cooperation with the CPU 11, the ROM 12, and the RAM 13.

The input device 14 includes inputting means such as a mouse, a keyboard, a touch panel, a button, a microphone, a switch, and a lever, for the user to input information, an input control circuit that generates an input signal on the basis of input by the user, and outputs the generated input signal to the CPU 11, and the like. The user of the information processing apparatus 1 is able to input various kinds of data and direct processing operations with respect to the information processing apparatus 1, by operating the input device 14.

The output device 15 includes a display device such as a liquid crystal display (LCD) device, an OLED device, a see-through display, and a lamp, for example. Furthermore, the output device 15 includes a voice output device such as a speaker and headphones. For example, the display device displays a captured image, a generated image or the like. On the other hand, the voice output device converts voice data and the like into voice, and then outputs the voice. The output device 15 corresponds to the display unit 170 described with reference to FIG. 2.

The storage device 16 is a device for storing data. The storage device 16 may include a storage medium, a recording device that stores data in a storage medium, a readout device that reads out data from a storage medium, a deletion device that deletes data recorded in a storage medium, and the like. The storage device 16 stores programs executed by the CPU 11 and various kinds of data. The storage device 16 corresponds to the storage unit 160 described with reference to FIG. 2.

The imaging device 17 includes an imaging optical system such as a shooting lens which collects light and a zoom lens, and a signal conversion device such as a charge coupled device (CCD) and a complementary metal oxide semiconductor (CMOS). The imaging optical system collects light emitted from a subject to form a subject image at a signal converting unit, and the signal conversion device converts the formed subject image into an electrical image signal. The imaging device 17 corresponds to the sensor unit 110 described with reference to FIG. 2.

The communication device 18 is a communication interface including a communication device for connecting to the communication network, or the like, for example. Also, the communication device 18 may be a wireless local area network (LAN) compatible communication device, a long term evolution (LTE) compliant communication device, a wired communication device that performs communication via a wire, or a Bluetooth communication device.

6. CONCLUSION

As described above, according to an embodiment of the present disclosure, since a user operation depending on the recognition accuracy is specified, and also since the user is notified of the user operation depending on the recognition accuracy, the user becomes able to perform operations more comfortably with user operations depending on the recognition accuracy.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the foregoing embodiment, an example is described in which the information processing apparatus 1 is provided with the sensor unit 110, the recognition unit 120, the storage unit 160, and the like, but the present technology, is not limited to such an example. For example, the information processing apparatus 1 may also receive sensing data and information about a recognition result, the recognition accuracy, and the like from another apparatus, either directly or through a network or the like, specify the user operation, and output a control signal to another apparatus.

Also, the respective steps in the embodiment described above do not necessarily have to be performed chronologically in the order illustrated in the flowchart. For example, the respective steps in the process of the embodiment described above may also be performed in a different order than the order illustrated in the flowchart, or they may be performed in parallel.

Also, a computer program for causing the hardware such as the CPU, ROM, RAM and the like built in the information processing apparatus 1 to demonstrate the function of the information processing apparatus 1 described above can also be created. Also, a storage medium that has the computer program stored therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an acquisition unit configured to acquire a recognition accuracy related to a recognition based on sensing data; and a control unit configured to make a first user operation recognizable when the recognition accuracy is included in a first range, and make a second user operation recognizable when the recognition accuracy is included in a second range different from the first range, the second user operation being different from the first user operation and related to the first user operation.

(2)

The information processing apparatus according to (1), in which the first user operation and the second user operation are recognized on a basis of sensing data related to an identical target.

(3)

The information processing apparatus according to (1) or (2), in which an upper limit value of the second range is less than or equal to a lower limit value of the first range.

(4)

The information processing apparatus according to (3), in which the control unit causes a predetermined process to be executed on a basis of a recognized user operation, and a type of process executed on a basis of a user operation recognizable when the recognition accuracy is included in the first range includes a type of process executed on a basis of a user operation recognizable when the recognition accuracy is included in the second range.

(5)

The information processing apparatus according to (4), in which the control unit causes a user to be notified that the first user operation is recognizable when the recognition accuracy is included in the first range, and causes the user to be notified that the second user operation is recognizable when the recognition accuracy is included in the second range.

(6)

The information processing apparatus according to any one of (1) to (5), in which the recognition accuracy is specified on a basis of a confidence level of the recognition.

(7)

The information processing apparatus according to any one of (1) to (6), in which the recognition accuracy is specified on a basis of an error or an accuracy of the sensing data.

(8)

The information processing apparatus according to any one of (1) to (7), in which the first user operation and the second user operation are user operations recognized on a basis of sensing data related to a user's hand, and the number of fingers on the user's hand recognized in the first user operation is greater than the number of fingers on the user's hand recognized in the second user operation.

(9)

The information processing apparatus according to (8), in which the first user operation and the second user operation are user operations for causing a first process to be executed, and the control unit makes a user operation for causing a second process different from the first process to be executed recognizable when the recognition accuracy is included in the first range, and does not make a user operation for causing the second process to be executed recognizable when the recognition accuracy is included in the second range.

(10)

The information processing apparatus according to any one of (1) to (9), in which the control unit sets an operating region such that an operating region that is operated in the second user operation is larger than an operating region that is operated in the first user operation.

(11)

The information processing apparatus according to (10), in which the control unit causes an operating region indicator that indicates the operating region to be displayed, and the operating region indicator is displayed at a size corresponding to a size of the operating region.

(12)

The information processing apparatus according to (10), in which the first user operation and the second user operation are user operations recognized on a basis of sensing data related to a user's fingertip, or sensing data related to a user's line of sight, and the operating region is specified on a basis of a position of the user's fingertip or a position of the user's line of sight.

(13)

The information processing apparatus according to any one of (1) to (12), in which the first user operation and the second user operation are user operations recognized on a basis of recognition of a speech pattern, and the number of speech patterns recognized in the first user operation is greater than the number of speech patterns recognized in the second user operation.

(14)

The information processing apparatus according to any one of (1) to (13), further including:

a range setting unit configured to set the first range and the second range.

(15)

The information processing apparatus according to (14), in which the range setting unit sets the first range and the second range on a basis of user information related to a user.

(16)

The information processing apparatus according to (15), in which the user information includes movement speed information about the user, or biological information about the user.

(17)

The information processing apparatus according to any one of (14) to (16), in which the range setting unit sets the first range and the second range on a basis of environment information related to an environment in which a user is placed.

(18)

The information processing apparatus according to (17), in which the environment information includes information about illuminance or information about a degree of congestion.

(19)

An information processing method including:

acquiring a recognition accuracy related to a recognition based on sensing data; and executing control, with a processor, to make a first user operation recognizable when the recognition accuracy is included in a first range, and to make a second user operation recognizable when the recognition accuracy is included in a second range different from the first range, the second user operation being different from the first user operation and related to the first user operation.

(20)

A program causing a computer to realize:

an acquisition function of acquiring a recognition accuracy related to a recognition based on sensing data; and a control function of making a first user operation recognizable when the recognition accuracy is included in a first range, and making a second user operation recognizable when the recognition accuracy is included in a second range different from the first range, the second user operation being different from the first user operation and related to the first user operation.

REFERENCE SIGNS LIST

1 information processing apparatus
110 sensor unit
120 recognition unit
130 acquisition unit
140 range setting unit
150 control unit
160 storage unit
170 display unit

The invention claimed is:

1. An information processing apparatus comprising:
circuitry configured to:
    acquire a recognition accuracy of a recognition of user operations, based on sensing data acquired from executing sensing of a target of a user; and
    recognize a first user operation when the recognition accuracy of the first user operation is included in a first range, and recognize a second user operation when the recognition accuracy of the second user operation is included in a second range different from the first range, the second user operation being different from the first user operation,
wherein the first user operation and the second user operation are user operations recognized on a basis of sensing data related to a hand of the user, and a number of fingers on the hand of the user recognized in the first user operation is greater than the number of fingers on the hand of the user recognized in the second user operation,
wherein the first user operation and the second user operation are user operations for causing a first process to be executed, and
wherein the circuitry is further configured to:
    recognize a user operation for causing a second process different from the first process to be executed when the recognition accuracy is included in the first range; and not recognize the user operation for causing the second process to be executed when the recognition accuracy is included in the second range.

2. The information processing apparatus according to claim 1, wherein
the first user operation and the second user operation are recognized on a basis of sensing data related to an identical target.

3. The information processing apparatus according to claim 1, wherein
an upper limit value of the second range is less than or equal to a lower limit value of the first range.

4. The information processing apparatus according to claim 3, wherein
the circuitry is further configured to cause a predetermined process to be executed on a basis of a recognized user operation, and
a type of process executed on a basis of a user operation that is recognized when the recognition accuracy is included in the first range includes another type of process executed on a basis of another user operation that is recognized when the recognition accuracy is included in the second range.

5. The information processing apparatus according to claim 4, wherein
the circuitry is further configured to:
cause the user to be notified that the first user operation is recognized when the recognition accuracy is included in the first range; and
cause the user to be notified that the second user operation is recognized when the recognition accuracy is included in the second range.

6. The information processing apparatus according to claim 1, wherein
the recognition accuracy is specified on a basis of a confidence level of a recognition.

7. The information processing apparatus according to claim 1, wherein
the recognition accuracy is specified on a basis of an error or an accuracy of the sensing data.

8. The information processing apparatus according to claim 1, wherein
the circuitry is further configured to set an operating region such that a first operating region that is operated in the second user operation is larger than a second operating region that is operated in the first user operation.

9. The information processing apparatus according to claim 1, wherein
the circuitry is further configured to cause an operating region indicator that indicates an operating region to be displayed, and the operating region indicator is displayed at a size corresponding to a size of the operating region.

10. The information processing apparatus according to claim 8, wherein
the first user operation and the second user operation are user operations recognized on a basis of sensing data related to a fingertip of the user, or sensing data related to a line of sight of the user, and the operating region is specified on a basis of a position of the fingertip of the user or a position of the line of sight of the user.

11. The information processing apparatus according to claim 1, wherein
the first user operation and the second user operation are user operations recognized on a basis of recognition of a speech pattern, and a number of speech patterns recognized in the first user operation is greater than a number of speech patterns recognized in the second user operation.

12. The information processing apparatus according to claim 1, wherein the circuitry is further configured to set the first range and the second range.

13. The information processing apparatus according to claim 12, wherein
the circuitry is further configured to set the first range and the second range on a basis of user information related to the user.

14. The information processing apparatus according to claim 13, wherein
the user information includes movement speed information about the user, or biological information about the user.

15. The information processing apparatus according to claim 12, wherein
the circuitry is further configured to set the first range and the second range on a basis of environment information related to an environment in which the user is placed.

16. The information processing apparatus according to claim 15, wherein
the environment information includes information about illuminance or information about a degree of congestion.

17. An information processing method comprising:
acquiring a recognition accuracy of a recognition of user operations, based on sensing data acquired from executing sensing of a target of a user;
executing control, with a processor, to recognize a first user operation when the recognition accuracy of the first user operation is included in a first range, and to recognize a second user operation when the recognition accuracy of the second user operation is included in a second range different from the first range, the second user operation being different from the first user operation,
wherein the first user operation and the second user operation are user operations recognized on a basis of sensing data related to a hand of the user, and a number of finders on the hand of the user recognized in the first user operation is greater than the number of finders on the hand of the user recognized in the second user operation, and
wherein the first user operation and the second user operation are user operations for causing a first process to be executed;
recognizing a user operation for causing a second process different from the first process to be executed when the recognition accuracy is included in the first range; and
not recognizing the user operation for causing the second process to be executed when the recognition accuracy is included in the second range.

18. A non-transitory computer-readable medium having embodied thereon a program, which when executed by a computer causes the computer to execute a method, the method comprising:
acquiring a recognition accuracy of a recognition of user operations, based on sensing data acquired from executing sensing of a target of a user;
recognizing a first user operation when the recognition accuracy of the first user operation is included in a first range, and recognizing a second user operation when the recognition accuracy of the second user operation is included in a second range different from the first range, the second user operation being different from the first user operation, wherein the first user operation and the second user operation are user operations recognized on a basis of sensing data related to a hand of the user, and a number of fingers on the hand of the user recognized in the first user operation is greater than the number of fingers on the hand of the user recognized in the second user operation, and wherein the first user operation and the second user operation are user operations for causing a first process to be executed;

recognizing a user operation for causing a second process different from the first process to be executed when the recognition accuracy is included in the first range; and not recognizing the user operation for causing the second process to be executed when the recognition accuracy is included in the second range.

* * * * *